(12) United States Patent
Shimano et al.

(10) Patent No.: US 8,597,780 B2
(45) Date of Patent: Dec. 3, 2013

(54) HARD COAT FILM

(75) Inventors: Emi Shimano, Tokyo-to (JP); Toshio Yoshihara, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 446 days.

(21) Appl. No.: 12/672,556

(22) PCT Filed: Aug. 8, 2008

(86) PCT No.: PCT/JP2008/064284
§ 371 (c)(1),
(2), (4) Date: Feb. 8, 2010

(87) PCT Pub. No.: WO2009/022639
PCT Pub. Date: Feb. 19, 2009

(65) Prior Publication Data
US 2011/0217541 A1 Sep. 8, 2011

(30) Foreign Application Priority Data

Aug. 10, 2007 (JP) .................. 2007-209780
Aug. 10, 2007 (JP) .................. 2007-209785

(51) Int. Cl.
*B32B 5/16* (2006.01)

(52) U.S. Cl.
USPC ........................................ 428/323

(58) Field of Classification Search
USPC ........................................ 428/323
See application file for complete search history.

(56) References Cited

U.S. PATENT DOCUMENTS

| 7,524,553 | B2 | 4/2009 | Yoneyama et al. |
| 2006/0216438 | A1* | 9/2006 | Nishimura et al. ........ 428/1.31 |
| 2007/0047087 | A1* | 3/2007 | Fukuda et al. ................ 359/582 |
| 2007/0172646 | A1 | 7/2007 | Tanabe et al. |

FOREIGN PATENT DOCUMENTS

| JP | 09-100111 A | 4/1997 |
| JP | 10-273595 A | 10/1998 |
| JP | 2000-052472 A | 2/2000 |
| JP | 2002-036436 A | 2/2002 |
| JP | 2002-154183 A | 5/2002 |
| JP | 2003-266582 A | 9/2003 |
| JP | 2007-086764 A | 4/2007 |
| JP | 2008-116596 A | 5/2008 |
| WO | 2005/116694 A1 | 12/2005 |

OTHER PUBLICATIONS

International Search Report: PCT/JP2008/064284.
USPTO NFOA mailed Oct. 18, 2012 in connnection with U.S. Appl. No. 13/525,588.

\* cited by examiner

*Primary Examiner* — Elizabeth A Robinson
(74) *Attorney, Agent, or Firm* — Ladas & Parry LLP

(57) ABSTRACT

A hard coat film excellent in abrasion resistance and saponification resistance. A hard coat layer includes a cured product of a curable resin composition containing a reactive inorganic fine particle having an average particle diameter of 5 nm to 30 nm, and has a skin layer, wherein the reactive inorganic fine particles are localized, in its surface region being an interface and its vicinity on a side opposite to a transparent substrate film side of the hard coat layer. Alternatively, the reactive inorganic fine particle has an average particle diameter of 30 nm to 100 nm, and has density distribution in a thickness direction of the hard coat layer lowest at an interface on a side opposite to a transparent substrate film side of the hard coat layer while the density is highest at an interface and its vicinity on the transparent substrate film side of the hard coat layer.

10 Claims, 5 Drawing Sheets

HARD COAT FILM

TECHNICAL FIELD

The present invention relates to a hard coat film in which a hard coat layer is provided on a transparent substrate film, and which is used for protecting the surface of a display such as a liquid crystal display, CRT display, projection display, plasma display or electroluminescence display.

BACKGROUND ART

It has been required that the image display surface of an image display device such as a liquid crystal display (LCD) and a cathode ray tube (CRT) display be imparted with abrasion resistance to avoid being scratched upon handling. To meet the request, in general, an optical laminate (hereinafter, it may be referred to as a hard coat film), which comprises a hard coat (HC) layer provided on a substrate film, is used to increase the abrasion resistance of the image display surface of an image display device.

Examples of techniques of hardening a plastic surface generally include methods of forming a metallic thin film by coating an organosiloxane-based or melamine-based heat-curable resin, by the vacuum deposition method or sputtering method using such a resin, and by coating a polyfunctional acrylate-based active energy ray-curable resin.

As another method of improving the hardness of a hard coat layer, there may be a method of adding inorganic fine particles, generally in which a hard coat film provided with a hard coat layer having inorganic fine particles added on a substrate film is produced.

Meanwhile, an optical film used as an antireflection film attached or disposed on the surface of a display for the purpose of antireflection of outside light to improve images is known (for example, see Patent Literature 1).

The optical film comprises a cured layer formed on a transparent plastic substrate film. Patent Literature 1 discloses that an apparently low refractive index layer can be formed, and excellent antireflective properties can be obtained by unevenly distributing hollow silica being low-refractive-index fine particles on the surface side of the cured layer (the side opposite to the substrate film side). Patent Literature 1 discloses that hollow silica having an average particle diameter of 30 nm or more to further decrease refractive index by increasing the ratio of voids, and hollow silica having an average particle diameter of 40 nm is used in Examples. In order to unevenly distribute hollow silica on the surface side of the cured layer, hollow silica is subjected to surface treatment with a fluorine-containing compound to decrease surface free energy.

CITATION LIST

[Patent Literature 1] Japanese Patent Application Laid-Open (JP-A) No. 2007-086764

SUMMARY OF INVENTION

Technical Problem

High abrasion resistance is required for hard coat films. A first object of the present invention is to provide a hard coat film having superior abrasion resistance to conventional hard coat films.

Also, there is another problem from another point of view. In production of the above image display, it is difficult to attach the substrate film side of the hard coat film directly on a polarizer using an adhesive (including tackiness agent). Thus, the surface of the substrate film is required to be subjected to chemical surface treatment (saponification treatment) by alkali.

However, there is a problem that when the hard coat film is used and dipped in an alkali solution, inorganic fine particles in the interface and its vicinity on the side opposite to the substrate film side of the hard coat layer elute or drop into the alkali solution. Also, there is a problem that when the amount of the inorganic fine particles contained in the hard coat layer is increased, the hardness of the hard coat film improves, but simultaneously the amount of the inorganic fine particles in the interface and its vicinity on the side opposite to the substrate film side of the hard coat layer increases, and the amount of the inorganic fine particles which elute or drop into the alkali solution also increases upon saponification treatment.

Therefore, conventionally, after a protecting film is provided on the surface of the hard coat layer provided on the substrate film, saponification treatment is performed for the purpose of protecting the hard coat layer from an alkali solution.

However, a hard coat film capable of resisting saponification treatment without the protecting film is required for further reduction of the production cost.

A second object of the present invention is to provide a hard coat film having high abrasion resistance and saponification resistance.

Solution to Problem

According to the present invention, a first aspect of the present invention hereinafter described is provided to attain the above first object, and a second aspect of the present invention hereinafter described is provided to attain the above second object.

As a result of diligent researches made to attain the above objects, the inventors of the present invention found out that when reactive inorganic fine particles having a specific particle size are contained in a hard coat layer, the reactive inorganic fine particles can be localized in the surface region of the hard coat layer, and have reached a hard coat film excellent in abrasion resistance.

A hard coat film according to a first aspect of the invention is a hard coat film in which a hard coat layer is provided on a transparent substrate film, wherein the hard coat layer comprises a cured product of a curable resin composition containing:

a reactive inorganic fine particle (A) having an average particle diameter of 5 nm to 30 nm, and having a reactive functional group (a) introduced by an organic component, which covers at least a part of a surface of the reactive inorganic fine particle (A), on the surface, and a curable binder system containing a binder component (B) having a reactive functional group (b) cross-linkingly reactive with the reactive functional group (a) of the reactive inorganic fine particle (A), and the curable binder system itself also having curing reactivity;

wherein the hard coat layer has a skin layer in its surface region being an interface and its vicinity on a side opposite to a transparent substrate film side of the hard coat layer, in which the skin layer has higher average particle number of the reactive inorganic fine particle (A) per unit area of a thickness-directional cross section of the hard coat layer than a region of the hard coat layer closer to the transparent substrate film side than the surface region; and wherein an average particle number of the reactive inorganic fine particle (A) per unit area of a thickness-directional cross section of the skin layer is twice or more than that of the reactive inorganic fine particle (A) per unit area of the thickness-directional cross section of the hard coat layer.

According to the first aspect of the invention, the reactive inorganic fine particles (A) aggregate at the interface on the side opposite to the transparent substrate film side of the hard coat layer to form the skin layer, and since the skin layer has high hardness and film strength due to increase in crosslinking point by the reactive functional group (a) of the reactive inorganic fine particle (A) and the reactive functional group (b) of the binder component (B) and the hardness of the reactive inorganic fine particles (A), a hard coat film excellent in hard coating performance can be obtained.

In the hard coat film of the first aspect of the invention, a thickness of the skin layer is preferably a thickness from the interface on the side opposite to the transparent substrate film side to the average particle diameter of the reactive inorganic fine particle (A) up to twice of the average particle diameter to further increase the effect of improving the hard coating performance by the skin layer. Also, the reactive inorganic fine particles (A) are preferably aggregated in the skin layer.

Further, the average particle number of the reactive inorganic fine particle (A) per unit area of the thickness-directional cross section of the skin layer is preferably 2,000/$\mu m^2$ or more, and an average particle number of the reactive inorganic fine particle (A) per unit area of the thickness-directional cross section of the whole hard coat layer is preferably 2,000/$\mu m^2$ or less.

Also, as the reactive inorganic fine particle (A), a reactive inorganic fine particle (A) containing no fluorine can be used.

According to the first aspect of the invention, a hard coat film provided with a hard coat layer, wherein the surface of the hard coat layer has no scratch after a steel wool scratch test, in which the surface of the hard coat layer is frictioned with #0000 steel wool by reciprocating the steel wool with a load of 500 g/cm$^2$ for 10 times at a speed of 50 mm/sec, and excellent in hard coating performance can be provided.

In the hard coat film of the first aspect of the invention, a layer thickness of the hard coat layer is preferably from 2 to 30 μm from the viewpoint of excellent production of the hard coat layer.

As a result of diligent researches made to attain the above objects, the inventors of the present invention found out that by adding the reactive inorganic fine particles (A) having a specific particle size different from that of the first aspect of the invention in the curable binder system used for the hard coat layer, a hard coat film having high abrasion resistance and excellent in saponification resistance can be obtained. Based on the above knowledge, the inventor has reached a second aspect of the invention.

A hard coat film according to the second aspect of the invention is a hard coat film in which a hard coat layer is provided on a transparent substrate film, wherein the hard coat layer comprises a cured product of a curable resin composition for the hard coat layer containing:

a reactive inorganic fine particle (A) having an average particle diameter of 30 nm to 100 nm, and having a reactive functional group (a) introduced by an organic component, which covers at least a part of a surface of the reactive inorganic fine particle (A), on the surface, and a curable binder system containing a binder component (B) having a reactive functional group (b) cross-linkingly reactive with the reactive functional group (a) of the reactive inorganic fine particle (A), and the curable binder system itself also having curing reactivity; and wherein the reactive inorganic fine particle (A) has density distribution in a thickness direction of the hard coat layer, in which density of the reactive inorganic fine particle (A) is lowest at an interface on a side opposite to a transparent substrate film side of the hard coat layer while the density of the reactive inorganic fine particle (A) is highest at an interface and its vicinity on the transparent substrate film side of the hard coat layer.

Since the reactive inorganic fine particle (A) has high hardness, the reactive inorganic fine particle (A) is hardly crushed by pressure (external pressure) applied to the particle from outside and has excellent pressure resistance. Also, since the reactive inorganic fine particle (A) has the reactive functional group (a) cross-linkingly reactive with the reactive functional group (b) of the binder component (B), the reactive inorganic fine particle (A) can crosslink with the binder component (B). Hence, since the hard coat layer of the present invention contains the reactive inorganic fine particles (A) having high hardness, the hard coat layer of the present invention has high hardness. Further, since the reactive inorganic fine particles (A) and the binder component (B) form plural crosslinking points, the film strength of the hard coat layer improves and the hard coat layer of the present invention exhibits excellent abrasion resistance.

By setting the particle size of the reactive inorganic fine particle (A) within the above range, the diffusion coefficient of the reactive inorganic fine particle (A) becomes small, and thereby, the number of the reactive inorganic fine particle (A) present (density distribution) varies in the thickness direction of the hard coat layer. Specifically, the density of the reactive inorganic fine particle (A) is lowest at the interface and its vicinity on the side opposite to the transparent substrate film side of the hard coat layer while the density of the reactive inorganic fine particle (A) is highest at the interface and its vicinity on the transparent substrate film side of the hard coat layer. Hence, the hard coat film using the hard coat layer can decrease the number of the reactive inorganic fine particles (A) which elute or drop from the surface of the hard coat layer into an alkali solution upon saponification treatment, and can improve the saponification resistance. Thereby, a protecting film for saponification treatment of the hard coat film is not necessary, so that the number of processes and material cost can be reduced.

In the hard coat film of the second aspect of the invention, when a thickness-directional cross section of the hard coat layer is defined as P1 and a vertical-directional density of the reactive inorganic fine particle (A) in the cross section P1 is defined as a number (particles/$\mu m^2$) of the reactive inorganic fine particle (A) per unit area of the cross section P1, density of the reactive inorganic fine particle (A) at any part in an region from the interface on the side opposite to the transparent substrate film side to 500 nm in depth of the cross section P1 is preferably 150 particles/$\mu m^2$ or less.

Further, a number of the reactive inorganic fine particle (A) partially projected from the interface on the side opposite to the transparent substrate film side of the hard coat layer is preferably 150 or less per unit area of the interface.

By setting the density of the reactive inorganic fine particle (A) or the number of the reactive inorganic fine particle (A) present in the above ranges, the number of the reactive inorganic fine particles (A) which elute or drop from the surface of the hard coat layer upon saponification treatment can be decreased. Thereby, the saponification resistance of the hard coat film of the present invention can be improved.

In the hard coat film of the second aspect of the invention, when a planar-directional cross section of the hard coat layer is defined as P2 and a planar-directional density of the reactive inorganic fine particle (A) in the cross section P2 is defined as a number (particles/µm²) of the reactive inorganic fine particle (A) per unit area of the cross section P2, difference of densities of the reactive inorganic fine particle (A) of two parts in the cross section P2 at any height of the hard coat layer is preferably 30 particles/µm² or less from the viewpoint of improvement of the hardness of a cured film.

In the hard coat film of the second aspect of the invention, hardness of the hard coat layer when a pencil hardness test in accordance with JIS K5600-5-4 (1999) is performed with a load of 500 g is preferably 4H or more from the viewpoint of abrasion resistance and prevention of scratch.

In the hard coat film of the second aspect of the invention, layer thickness of the hard coat layer is preferably from 1 µm to 100 µm.

In the hard coat film of the first and second aspects of the invention, at least a part of the surface of the reactive inorganic fine particle (A) is covered by the organic component, the reactive functional group (a) is introduced on the surface of the reactive inorganic fine particle (A) by the organic component, and the organic component is contained by $1.00 \times 10^{-3}$ g/m² or more per unit area of the inorganic fine particle before being covered from the viewpoint of improving the hardness of a cured film.

In the hard coat film of the first and second aspects of the invention, the reactive functional group (a) of the reactive inorganic fine particle (A) and the reactive functional group (b) of the binder component (B) preferably have a polymerizable unsaturated group from the viewpoint of hard coating performance.

Also, from the viewpoint of improving the film strength even if the amount of the organic component content is small, the reactive inorganic fine particles (A) are preferably obtained by dispersing inorganic fine particles in water and/or an organic solvent serving as a dispersion media in the presence of one or more kinds of surface modification compounds having a molecular weight of 500 or less selected from the group consisting of saturated or unsaturated carboxylic acid, acid anhydride, acid chloride, ester and acid amide corresponding to the carboxylic acid, amino acid, imine, nitrile, isonitrile, an epoxy compound, amine, a β-dicarbonyl compound, silane and a metallic compound having a functional group.

From the viewpoint of being capable of efficient surface modification of the reactive inorganic fine particle (A) with the organic component, the surface modification compound is a compound having a hydrogen bond-forming group. Also, from the viewpoint of easy formation of a crosslinking bond between the reactive functional group (a) introduced to the reactive inorganic fine particle (A) and the reactive functional group (b) of the binder component (B) and further improvement of the film strength, at least one kind of the surface modification compound preferably has a polymerizable unsaturated group to be the reactive functional group (a).

From the viewpoint of improving dispersibility to the organic component and the film strength, the reactive inorganic fine particles (A) are preferably obtained by bounding a compound containing the reactive functional group (a) being introduced on the surface of the reactive inorganic fine particle (A), a group represented by the following chemical formula (1), and a silanol group or a group producing the silanol group by hydrolysis, with metal oxide fine particles:

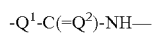   Chemical formula (1)

wherein $Q^1$ is NH, O (oxygen atom) or S (sulfur atom); and $Q^2$ is O or S.

The binder component (B) is preferably a compound having three or more reactive functional groups (b). The binder component (B) is more preferably a compound having three or more reactive functional groups (b) capable of bonding with the reactive functional group (a) of the reactive inorganic fine particle (A).

A content of the reactive inorganic fine particle (A) is preferably from 10 to 60 wt % with respect to a total solid content.

In the hard coat film of the present invention, it is preferable that the transparent substrate film mainly comprises cellulose acylate, a cycloolefin polymer, an acrylate-based polymer or polyester.

Advantageous Effects of Invention

The hard coat film according to the first aspect of the invention has excellent hard coating performance since the hard coating performance of the hard coat layer is improved by unevenly distributing the reactive inorganic fine particles having a specific particle diameter and having the reactive functional group capable of forming a crosslinking bond with the binder component forming the hard coat layer at the surface region being the interface and its vicinity on the side opposite to the transparent substrate film side of the hard coat layer.

In the hard coat film according to the second aspect of the invention, the density of the reactive inorganic fine particle (A) is lowest at the interface on the side opposite to the transparent substrate film side of the hard coat layer while the density of the reactive inorganic fine particle (A) is highest at the interface and its vicinity on the transparent substrate film side of the hard coat layer. Hence, the hard coat film using the hard coat layer can decrease the number of the reactive inorganic fine particles (A) which elute or drop from the surface of the hard coat layer into an alkali solution upon saponification treatment, and can improve the saponification resistance. Thereby, a protecting film for saponification treatment of the hard coat film is not necessary, so that the number of processes and material cost can be reduced.

Also, since the reactive functional group (a) of the reactive inorganic fine particle (A) and the reactive functional group (b) of the curable binder component (B) contained in the curable binder system form a crosslinking bond, the hard coat film can have high hard coating performance.

REFERENCE SIGNS LIST

Figure 1:
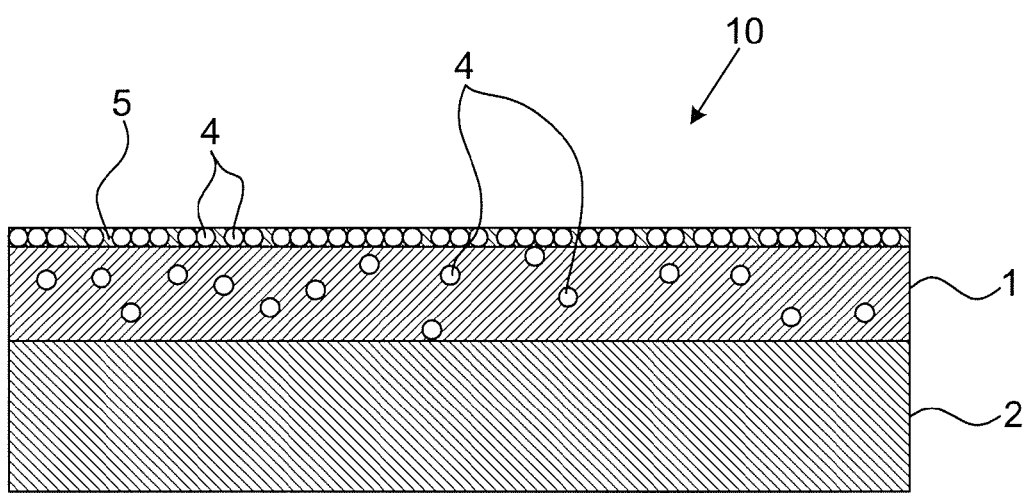
FIG. 1 is a sectional view schematically showing an example of a hard coat film of the first aspect of the invention.

1: Hard coat layer
2: Transparent substrate film
4: Reactive inorganic fine particle (A)
5: Skin layer
10: Hard coat film
30: Interface on the side opposite to the transparent substrate film side of a hard coat layer
40: Interface on the transparent substrate film side of a hard coat layer
P1: Thickness-directional cross section of the hard coat layer
P2: Planar-directional cross section of the hard coat layer Description of Embodiments Hereinafter, a hard coat film of a first aspect and a second aspect of the invention of will be further explained. Firstly, the first aspect of the invention will be explained, and then, the second aspect of the invention will be explained. Upon explaining the second aspect of the invention, the explanation in common with the first aspect of the invention is abbreviated.

1. Explanation of First Aspect

A hard coat film of a first aspect of the invention is a hard coat film in which a hard coat layer is provided on a transparent substrate film,
  wherein the hard coat layer comprises a cured product of a curable resin composition containing:
    a reactive inorganic fine particle (A) having an average particle diameter of 5 nm to 30 nm, and having a reactive functional group (a) introduced by an organic component, which covers at least a part of a surface of the reactive inorganic fine particle (A), on the surface, and
    a curable binder system containing a binder component (B) having a reactive functional group (b) cross-linkingly reactive with the reactive functional group (a) of the reactive inorganic fine particle (A), and the curable binder system itself also having curing reactivity;
  wherein the hard coat layer has a skin layer in its surface region being an interface and its vicinity on a side opposite to a transparent substrate film side of the hard coat layer, in which the skin layer has higher average particle number of the reactive inorganic fine particle (A) per unit area of a thickness-directional cross section of the hard coat layer than a region of the hard coat layer closer to the transparent substrate film side than the surface region; and
  wherein an average particle number of the reactive inorganic fine particle (A) per unit area of a thickness-directional cross section of the skin layer is twice or more than that of the reactive inorganic fine particle (A) per unit area of the thickness-directional cross section of the hard coat layer.

Herein, the skin layer is a layer structure wherein the reactive inorganic fine particles (A) are unevenly distributed in the surface region which is from an interface (i.e. air interface) on the side opposite to the transparent substrate film side of the hard coat layer to a certain depth, and constitutes the outer most surface of the air interface side of the hard coat layer. The skin layer contains more reactive inorganic fine particles (A) than the region in the hard coat layer closer to the transparent substrate film side than the surface region. In the hard coat layer, the average particle number of the reactive inorganic fine particles (A) per unit area of the thickness-directional cross section of the hard coat layer sharply decreases from a certain depth away from the interface on the side opposite to the transparent substrate film side towards the transparent substrate film side, thus, a border of the skin layer can be clearly determined. The average particle number of the reactive inorganic fine particles (A) per unit area of the thickness-directional cross section of the skin layer is twice or more than the average particle number of the reactive inorganic fine particles (A) per unit area of the thickness-directional cross section of the whole hard coat layer including the skin layer.

FIG. 1 shows an example of one embodiment of the hard coat film of the first aspect of the invention. In the hard coat film 10 shown in FIG. 1, the hard coat layer 1 is directly provided on one surface of the transparent substrate film 2. The hard coat layer 1 has the skin layer 5, in which reactive inorganic fine particles 4 are unevenly distributed at the interface on the side opposite to the transparent substrate film 2 side of the hard coat layer 1.

Figure 2:
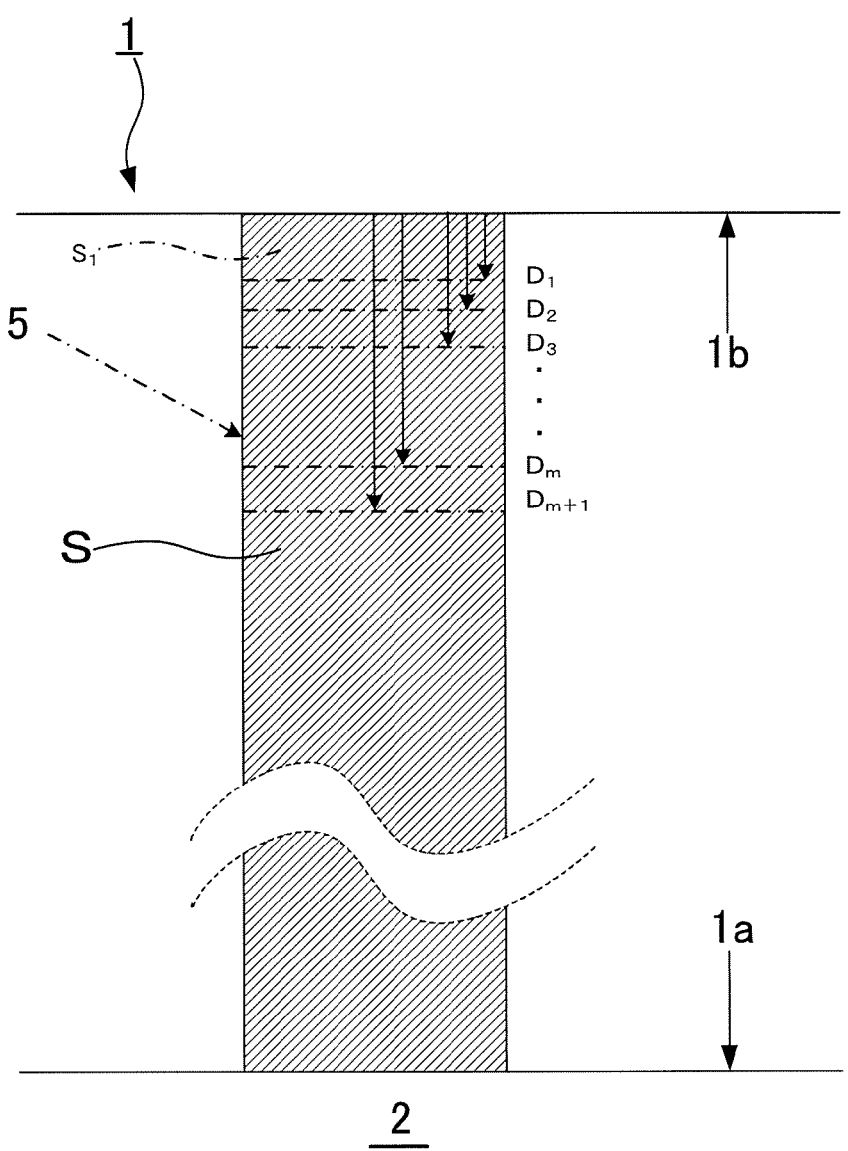
FIG. 2 is a schematic view to explain a skin layer of the first aspect of the invention.

The distribution state of reactive inorganic fine particles (A) in the hard coat layer 1 of the hard coat film of the first aspect of the invention will be explained with reference to FIG. 2.

In the thickness-directional cross section of the hard coat layer 1, a region which is surrounded by an interface 1a on the transparent substrate film 2 side, an interface (air side interface) 1b on the side opposite to the transparent substrate film side and two sides parallel to the thickness direction of the hard coat layer 1 is referred to as a region S. The average particle number P of the reactive inorganic fine particles (A) per unit area of the region S is defined as the average particle number of the reactive inorganic fine particles (A) per unit area of the thickness-directional cross section of the whole hard coat layer.

In the region S, when the average particle number $p_1$ per unit area of the region $S_1$ from the air side interface to a certain depth $D_1$ is measured, $p_1 > P \times 2$. When the average particle number p per unit area of the region S from the air side interface to the depth D being deeper than $D_1$ is measured, the average particle number $p_m$ per unit area is $p_m = P \times 2$ at the depth $D_m$. In the region $S_{m+1}$ having a depth from the air side interface of $D_{m+1}$ being deeper than $D_m$, the average particle number $p_{m+1}$ per unit area is $p_{m+1} < P \times 2$. Herein, the region $S_m$ from the air interface side to the depth $D_m$ can be considered as the skin layer 5.

The distribution state of the reactive inorganic fine particles (A) in the hard coat layer can be confirmed by the scanning transmission electron microscope (STEM) photograph etc. of the hard coat layer. The border of the skin layer having reactive inorganic fine particles (A) unevenly distributed can be visually determined.

Also, the average particle number of the reactive inorganic fine particles (A) per unit area of the thickness-directional cross section of the hard coat layer can be obtained as below. That is, the average particle number per unit area can be calculated by counting the number of the reactive inorganic fine particles (A) in a STEM photograph etc. of the depth-directional cross section of the hard coat layer, and dividing the counted number of particles by the area where the particles are present.

By having the reactive inorganic fine particles (A) unevenly distributed at the surface region being the interface and its vicinity on the side opposite to the transparent substrate film side of the hard coat layer, and having higher average particle number of the reactive inorganic fine particles (A) than a region other than the surface region, the hardness of the hard coat layer can be improved due to high hardness of the reactive inorganic fine particles (A) themselves. Further, due to uneven distribution of the crosslinking points of the reactive inorganic fine particles (A) and the binder component (B), film strength can be improved. By unevenly distributing the reactive inorganic fine particles (A), the hard coating performance of the surface of the hard coat layer can be significantly and efficiently increased in comparison with the case having the same amount of the reactive inorganic fine particles (A) dispersed in the whole hard coat layer.

Moreover, in the hard coat film of the present invention, the reactive inorganic fine particles (A) are unevenly distributed from the surface of the hard coat layer to a certain depth (skin layer), and the average particle number of the reactive inorganic fine particles (A) per unit area of a thickness-directional cross section drastically decreases when it is deeper than the above certain depth. By distributing the reactive inorganic fine particles (A) so that the border of the region (skin layer) where reactive inorganic fine particles (A) are unevenly distributed is clear, the hard coating performance of the hard coat layer can be effectively increased compared to the case that reactive inorganic fine particles are unevenly distributed in a graded structure in which the density of the reactive inorganic fine particles gradually decreases from the surface of the hard coat layer.

The thickness of the skin layer is preferably from the interface on the side opposite to the transparent substrate film side to the average particle diameter of the reactive inorganic fine particle (A) up to twice of the average particle diameter. By unevenly distributing the reactive inorganic fine particles (A) in a significantly limited narrow surface region on the air interface side of the hard coat layer, the hard coating performance of the hard coat layer can be efficiently increased.

Also, to increase the effect of improving the hard coating performance of the skin layer, it is preferable that the reactive inorganic fine particles (A) are aggregated in the skin layer. Herein, "reactive inorganic fine particles (A) are aggregated" means a state that adjacent reactive inorganic fine particles (A) are in contact with each other. By increasing uneven distribution of the reactive inorganic fine particles (A) in the skin layer, the hardness and film strength of the surface of the hard coat layer can be further improved.

If the average particle number of the reactive inorganic fine particles (A) per unit area of a thickness-directional cross section of the skin layer is twice or more, more preferably three times or more, even more preferably five times or more, than the average particle number of the reactive inorganic fine particles (A) per unit area of the thickness-directional cross section of the whole hard coat layer including the skin layer, the hard coating performance of the hard coat layer can be sufficiently improved.

More specifically, it is preferable that the average particle number of the reactive inorganic fine particles (A) per unit area of the thickness-directional cross section of the skin layer is 2,000/µm$^2$ or more, and the average particle number of the reactive inorganic fine particles (A) per unit area of the thickness-directional cross section of the whole hard coat layer is 2,000/µm$^2$ or less. From the viewpoint of the hard coating performance of the hard coat layer, particularly, it is more preferable that the average particle number of the reactive inorganic fine particles (A) per unit area of a thickness-directional cross section of the skin layer is 3,000/µm$^2$ or more.

In the hard coat film, the hard coat layer is always disposed on the surface at the side of an observer. Herein, "the side of an observer" in the present invention means the surface which is faced to the observer when the hard coat film of the present invention is disposed on the front face of an image display. "Display side" in the present invention means the surface which is faced to an image display body when the hard coat film of the present invention is disposed on the front face of the image display.

In the hard coat film 10 shown in FIG. 1, the hard coat layer is directly disposed on the transparent substrate film, but the hard coat layer may be disposed on the transparent substrate film via other layers. The hard coat layer is not limited to a single layer and may be a laminated structure having two or more layers. The specific laminated structure will be described hereinafter.

Hereinafter, the hard coat film of the present invention will be explained in detail.

Herein, "(meth)acryloyl" means acryloyl and/or methacryloyl, "(meth)acrylate" means acrylate and/or methacrylate, and "(meth)acryl" means acryl and/or methacryl. Also, herein, "light" includes not only electromagnetic waves having a wavelength in the visible or nonvisible region but also particle beams (e.g. electron beams) and radiation (a general term for electromagnetic waves and particle beams) or ionizing radiation.

Also, herein, the reactive functional group (a) and the reactive functional group (b) include a photocurable functional group and a heat-curable functional group. The photocurable functional group means a functional group which can proceed a polymerization reaction, a crosslinking reaction, etc. by light radiation and cure a coating layer. The examples include photocurable functional groups which proceed a reaction by polymerization reaction such as photo-radical polymerization, photo-cationic polymerization and photo-anionic polymerization, and by a reaction form including addition polymerization and condensation polymerization via photodimerization. Also, herein, the heat-curable functional group means a functional group which can cure a coating layer by proceeding polymerization reaction, crosslinking reaction, etc. of the same kind of functional groups or between different kinds of functional groups by heating. The examples include a hydroxy group, a carboxyl group, an amino group, an epoxy group and an isocyanate group.

As the reactive functional group used in the present invention, a polymerizable unsaturated group, preferably a photocurable unsaturated group, even more preferably ionizing radiation-curable unsaturated group, is suitably used particularly from the viewpoint of improvement of hardness of a cured film. Specific examples thereof include ethylene double bonds such as a (meth) acryloyl group, a vinyl group and an allyl group, and an epoxy group.

<Transparent Substrate Film>

The material of the transparent substrate film is not particularly limited, but any material generally used for a hard coat film may be used. The examples include materials mainly comprising cellulose acylate, a cycloolefin polymer, an acrylate-based polymer or polyester. The "mainly comprising" used herein means a component that has the highest content rate among the components of the transparent substrate film.

Specific examples of the cellulose acylate include cellulose triacetate, cellulose diacetate and cellulose acetate butyrate.

Examples of the cycloolefin polymer include norbornene polymers, monocyclic olefin polymers, cyclic conjugated diene polymers and vinyl alicyclic hydrocarbon polymer resins. More specifically, there may be ZEONEX and ZEONOR (product names; manufactured by ZEON CORPORATION; norbornene resins), SUMILITE FS 1700 (product name; manufactured by SUMITOMO BAKELITE CO., LTD.), ARTON (product name; manufactured by JSR Corporation; modified norbornene resin), APEL (product name; manufactured by MITSUI CHEMICALS, INC.; cycloolefin copolymer), Topas (product name; manufactured by Ticona; cycloolefin copolymer), and OZ 1000 Series of OPTOREZ (product name; manufactured by Hitachi Chemical Company, Ltd.; alicyclic acrylic resin).

Specific examples of the acrylate-based polymer include poly(methyl(meth)acrylate), poly(ethyl(meth)acrylate) and methyl(meth)acrylate-butyl(meth)acrylate copolymers. Herein, (meth)acrylate means acrylate, methacrylate or a mixed system of both.

Specific examples of the polyester include polyethylene terephthalate and polyethylene naphthalate.

In the present invention, the transparent substrate film 2 is a thin flexible film-like body. The thickness is from 20 μm to 300 μm, preferably the upper limit is 200 μm or less and the lower limit is 30 μm or more. The transparent substrate film 2 may have paint called an anchor agent or a primer preliminarily applied besides physical treatment such as corona discharge treatment, oxidation treatment or the like upon forming the hard coat layer 1 on the transparent substrate film 2 for improvement of adhesion.

<Hard Coat Layer>

The hard coat layer is an essential layer in the hard coat film of the present invention, and provided on the surface on the side of an observer. The hard coat layer may be constituted with one layer only or two or more layers.

In the present invention, the hard coat layer formed preliminarily may be layered on the surface of the transparent substrate film, etc.

The hard coat layer of the hard coat film of the present invention is formed by containing the reactive inorganic fine particles (A) for increasing hard coating performance and components including the binder component (B) for imparting adhesion to the substrate and adjacent layers as an essential component and forming a matrix of the hard coat layer after curing the curable binder system, and further if necessary, additives such as an anti-static agent and a leveling agent, and an inorganic filler for adjustment of refractive index, prevention of crosslinking concentration or imparting high indentation strength. The hard coat layer is provided on the transparent substrate film directly or via other layers.

The "hard coat layer" generally means a layer which can obtain a hardness of "H" or more on the pencil hardness test defined in JIS K5600-5-4 (1999). It is preferable that the surface of the hard coat layer 1 for the first aspect of the invention has a hardness of "3H" or more on the pencil hardness test.

In the hard coat film of the first aspect of the invention, it is generally preferable that the layer thickness of the hard coat layer is 2 to 30 μm, more preferably 5 to 20 μm.

Hereinafter, constituent materials of the hard coat layer will be explained.

<Reactive Inorganic Fine Particles (A)>

The inorganic fine particles are generally contained in the hard coat layer to maintain transparency and improve hard coating performance. Also, by allowing inorganic fine particles having cross-linking reactivity and a curable binder to crosslinkingly react to form a crosslinking structure, the hard coating performance can be further improved. The reactive inorganic fine particle (A) means an inorganic fine particle, the surface of which has the reactive functional group (a) introduced by the organic component, which covers at least a part of the surface of inorganic fine particle being a core. The reactive inorganic fine particle (A) includes ones having two or more inorganic fine particles being cores per reactive inorganic fine particle (A).

By decreasing the particle size of the reactive inorganic fine particles (A), the crosslinking point in the matrix can be increased with respect to the content.

The hard coat layer of the present invention contains the above reactive inorganic fine particles (A) for the purpose of significantly improving hardness to have sufficient abrasion resistance. The reactive inorganic fine particles (A) may be ones imparting further functions to the hard coat layer, and can be selected according to purpose.

Examples of the inorganic fine particles include metal oxide fine particles of silica ($SiO_2$), aluminum oxide, zirconia, titania, zinc oxide, germanium oxide, indium oxide, tin oxide, indium tin oxide (ITO), antimony oxide and cerium oxide; and metal fluoride fine particles of magnesium fluoride and sodium fluoride. Also, metal fine particles, metal sulfide fine particles, metal nitride fine particles, etc. may be used.

From the viewpoint of high hardness, silica and aluminum oxide are preferable. Also, for making a layer having a relatively high refractive index, fine particles increasing refractive index upon forming a film such as zirconia, titania or antimony oxide may be accordingly selected and used. Similarly, for making a layer having a relatively low refractive index, fine particles which lower refractive index upon forming a film including fluoride fine particles such as magnesium fluoride, sodium fluoride and hollow silica fine particles can be accordingly selected and used. Further, to impart anti-static properties, electrical conductivity, indium tin oxide (ITO), tin oxide, etc. can be accordingly selected and used, which may be used alone or in combination of two or more kinds.

In the hard coat film of the present invention, in the case of using hollow reactive inorganic fine particles (A) such as hollow silica or reactive inorganic fine particles (A) having a porous structure, acceleration of uneven distribution of the reactive inorganic fine particles (A) toward the air interface side can be expected due to the apparent specific gravity (mass per unit volume, being averaged including the hollow parts), however, hollow or porous inorganic fine particles has lower hardness than non-hollow inorganic fine particles due to its structure. Therefore, in the present invention, it is preferable that typically by using non-hollow reactive inorganic fine particles (A), the hardness is ensured, and uneven distribution of the reactive inorganic fine particles (A) is accelerated by controlling its particle diameter.

On the surface of the inorganic fine particles, groups which generally cannot exist in the form in the inorganic fine particles. Such groups on the surface are generally relatively reactive functional groups. The examples include a hydroxyl group and an oxy group in the case of metal oxide, a thiol group and a thio group in the case of metal sulfide, and an amino group, an amide group and an imide group in the case of nitride.

The reactive inorganic fine particles (A) used in the present invention have at least a part of the surface of which covered by the organic component, and have reactive functional groups (a) which are introduced by the organic component on the surface. Herein, the organic component is a component containing carbon. Also, examples of the embodiment in which at least apart of the surface is covered by the organic component include an embodiment in which a compound containing organic component such as a silane coupling agent is reacted with a hydroxyl group present on the surface of the metal oxide fine particles, an embodiment in which the organic component is bonded to a part of the surface, an embodiment in which the organic component is attached to a hydroxyl group present on the surface of metal oxide fine particles by interaction such as hydrogen bond, and an embodiment in which one or more inorganic fine particles are contained in the polymer particles.

It is preferable that almost all surface of the particle is covered by the organic component from the viewpoint of preventing aggregation of inorganic fine particles from each other, and improving harness of the film by introducing many reactive functional groups on the surface of the inorganic fine particles. Due to these viewpoints, it is preferable that the organic component covering the reactive inorganic fine particle (A) is contained in the reactive inorganic fine particles (A) by $1.00 \times 10^{-3}$ g/m$^2$ or more per unit area of the inorganic fine particles before being covered.

In the embodiment that the organic component is attached or connected to the surface of the inorganic fine particle, the organic component covering the reactive inorganic fine particle (A) is contained in the reactive inorganic fine particles (A) more preferably by $2.00 \times 10^{-3}$ g/m$^2$ or more, even more preferably by $3.50 \times 10^{-3}$ g/m$^2$ or more, per unit area of the inorganic fine particle before being covered.

In the embodiment that the inorganic fine particles are contained in the polymer particles, the organic component covering the reactive inorganic fine particle (A) is contained in the reactive inorganic fine particles (A) more preferably by $3.50 \times 10^{-3}$ g/m$^2$ or more, even more preferably by $5.50 \times 10^{-3}$ g/m$^2$ or more, per unit area of the inorganic fine particle before being covered.

The ratio of the organic component covering the reactive inorganic fine particle (A) can be generally obtained by, for example, thermogravimetric analysis in air from room temperature generally to 800° C. as a constant mass value of percentage of weight reduction when dried powder is completely burned in air.

The amount of the organic component per unit area is obtained by the following method. Firstly, a value in which the weight of the organic component is divided with the weight of the inorganic component (the weight of the organic component/the weight of the inorganic component) is measured by differential thermogravimetric analysis (TG-DTA). Next, the volume of the whole inorganic component is calculated from the weight of the inorganic component and the specific gravity of the inorganic fine particles. Also, assuming that the inorganic fine particles before being covered are in spherical forms, the volume per inorganic fine particle before being covered and surface area are calculated from the average particle diameter of the inorganic fine particles before being covered. Next, the number of the inorganic fine particles before being covered is calculated by dividing the area of whole inorganic component by the volume per inorganic fine particle before being covered. Further, the amount of the organic component per reactive inorganic fine particle (A) is calculated by dividing the weight of the organic component by the number of inorganic fine particles. Finally, the amount of the organic component per unit area of the inorganic fine particle before being covered is calculated by dividing the weight of the organic component per reactive inorganic fine particle (A) by the surface area per inorganic fine particle before being covered.

The average particle diameter of the reactive inorganic fine particles (A) used for the first aspect of the invention is from 5 nm to 30 nm. The present invention uses such reactive inorganic fine particles (A) having a relatively small particle diameter. Thereby, uneven distribution of the reactive inorganic fine particles (A) in the hard coat layer toward a certain region (the surface region being an interface and its vicinity on the side opposite to the transparent substrate film side) is enhanced, and the improvement of the hard coating performance of the hard coat layer by the reactive inorganic fine particles (A) can be attained.

Since the reactive inorganic fine particle (A) having a small particle diameter, i.e. the average particle diameter in the above range, has a large specific surface area, the force of phase separation increases in the curable resin composition due to action based on compatibility with a binder component. As a result, in the curable resin composition applied on the transparent substrate film, a part of the reactive inorganic fine particles (A) naturally diffuse toward the air interface side, and are unevenly distributed.

As described above, the hard coat film of the first aspect of the invention accelerates uneven distribution of the reactive inorganic fine particles (A), and can attain improvement of the hard coating performance of the hard coat layer by utilizing increase of phase separation ability and diffuseness due to small particle diameter of the reactive inorganic fine particles (A).

The average particle diameter of the reactive inorganic fine particles (A) used for the first aspect of the invention is preferably from 5 nm to 30 nm, more preferably from 5 nm to 25 nm, from the viewpoint of hardness and excellent formation of the skin layer.

By setting the average particle diameter of the reactive inorganic fine particles (A) to be 5 nm or more, the hard coating performance of the hard coat layer can be sufficiently improved. On the other hand, by using the reactive inorganic fine particle (A) having an average particle diameter of 30 nm or less, uneven distribution of the reactive inorganic fine particles (A) can be sufficiently enhanced, and sufficient effect of improving the hard coating performance due to uneven distribution of the reactive inorganic fine particles (A). Also, since the reactive inorganic fine particle (A) having an average particle diameter of 30 nm or less has a large specific surface area, there is an advantage that the crosslinking point in the matrix can be increased, and a hard coat layer having high film strength can be obtained.

Also, from the viewpoint of significantly improving hardness without deteriorating transparency, and by maintaining the recovery rate of the hard coat layer when only a resin is used, it is preferable that the reactive inorganic fine particle (A) has narrow particle size distribution, and is monodispersed.

Herein, the average particle diameter can be obtained by observing a cross-section TEM photography of a hard coat film formed using the reactive inorganic fine particle (A), measuring particle diameters of reactive inorganic fine particles (A), and calculating an average value therefrom, or by preparing a sol comprising the reactive inorganic fine particles (A) dispersed in a solvent, and calculating 50% average particle diameter in the sol by means of, for example, Nanotrac (product name; manufactured by Nikkiso Co., Ltd.) or a particle size analyzer.

As the reactive functional group (a) of the reactive inorganic fine particle (A), a polymerizable unsaturated group is suitably used particularly from the viewpoint of improving hardness of a cured film. Preferred are photocurable unsaturated groups, and particularly preferred are ionizing radiation-curable unsaturated groups. Specific examples thereof include an ethylenic double bond such as a (meth) acryloyl group, vinyl group and allyl group, and an epoxy group.

As the method of preparing the reactive inorganic fine particle (A) in which at least a part of the surface is covered with an organic component and each particle has the reactive functional group (a) introduced onto the covered surface by the organic component, a conventionally-known method may be accordingly selected for use depending on the kind of the inorganic fine particle and reactive functional group (a) to be introduced.

Particularly in the present invention, it is preferred to accordingly select any of the following inorganic fine particles (i) and (ii) for use, from the viewpoint of containing the organic component covering the reactive inorganic fine particle (A) in the reactive inorganic fine particle (A) by 1.00× $10^{-3}$ g/m² or more per unit area of the inorganic fine particle before being covered, preventing aggregation of the inorganic fine particles and increasing the hardness of a film:

(i) inorganic fine particles having a reactive functional group on the surface obtained by dispersing inorganic fine particles in water and/or an organic solvent serving as a dispersion medium in the presence of one or more kinds of surface modification compounds having a molecular weight of 500 or less selected from the group consisting of saturated or unsaturated carboxylic acid, acid anhydride, acid chloride, ester and acid amide corresponding to the carboxylic acid, amino acid, imine, nitrile, isonitrile, an epoxy compound, amine, a β-dicarbonyl compound, silane and a metallic compound having a functional group; and (ii) inorganic fine particles having a reactive functional group on the surface obtained by bounding a compound containing the reactive functional group (a) being introduced on the surface of the reactive inorganic fine particle (A), a group represented by the following chemical formula (1), and a silanol group or a group producing the silanol group by hydrolysis, with metal oxide fine particles:

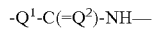  Chemical Formula (1)

wherein $Q^1$ is NH, O (oxygen atom) or S (sulfur atom); and $Q^2$ is O or S.

Hereinafter, the reactive inorganic fine particles (A) which are suitably used in the present invention will be described in order.

(i) Inorganic fine particles having a reactive functional group on the surface, in which particles are obtained by dispersing inorganic fine particles in water and/or an organic solvent serving as a dispersion medium, in the presence of one or more kinds of surface modification compounds which have a molecular weight of 500 or less and are selected from the group consisting of a saturated or unsaturated carboxylic acid, an acid anhydride, acid chloride, ester and acid amide corresponding to the carboxylic acid, an amino acid, an imine, a nitrile, an isonitrile, an epoxy compound, an amine, a 3-dicarbonyl compound, silane and a metallic compound having functional groups.

Use of the reactive inorganic fine particles (A) (i) is advantageous in that the film strength can be increased even if the content of the organic component is small.

The surface modification compound used for the reactive inorganic fine particle (A) (i) has a functional group that can chemically bound to, upon dispersion, a group present on the surface of the inorganic fine particle, such as a carboxyl group, acid anhydride group, acid chloride group, acid amide group, ester group, imino group, nitrile group, isonitrile group, hydroxyl group, thiol group, epoxy group, primary, secondary or tertiary amino group, Si—OH group, hydrolyzable residue of silane, or C—H acid group such as a β-dicarbonyl compound. The chemical bonding herein preferably includes covalent bonding, ionic bonding or coordination bonding, and hydrogen bonding. Coordination bonding is considered to be complex forming. For example, an acid-base reaction according to the Brønsted or Lewis definition, complex formation or esterification occurs between the functional groups of the surface modification compound and the groups present on the surface of the inorganic fine particles. The surface modification compound used for the reactive inorganic fine particle (A) (i) may be one kind of component solely or a mixture of two or more kinds of components.

In addition to at least one functional group (hereinafter referred to as first functional group) that can participate in chemical bonding with the groups that are present on the surface of the inorganic fine particles, the surface modification compound normally has molecular residues that impart, after being bound to the surface modification compound, a new property to the inorganic fine particles via the functional group. The molecular residues or a part of the molecular residues are hydrophobic or hydrophilic and, for example, can stabilize, integrate or activate the inorganic fine particles.

Examples of the hydrophobic molecular residue include an alkyl, aryl, alkaryl, and aralkyl group, all of which induce inactivation or repulsion. Examples of the hydrophilic group include a hydroxy group, alkoxy group and polyester group.

The reactive functional group (a), which is introduced to the surface of the reactive inorganic fine particle (A) so that the reactive inorganic fine particle (A) can react with the binder component (B) hereinafter described, is appropriately selected according to the reactive functional group (b) of the binder component (B). As the reactive functional group (a), a polymerizable unsaturated group is suitably used, and a photocurable unsaturated group is more preferable, an ionizing radiation-curable unsaturated group is even more preferable. The specific examples include ethylenically unsaturated bonds (particularly, ethylenic double bonds) such as a (meth) acryloyl group, a vinyl group and an allyl group, and an epoxy group.

In the case where the reactive functional groups (a) which are reactive with the binder component (B) are contained in the molecular residues of the surface modification compound, the reactive functional groups (a) that are reactive with the binder component (B) can be introduced onto the surface of the reactive inorganic fine particles (A) (i) by allowing the first functional group (s) contained in the surface modification compound to react with the surface of the inorganic fine particles. For example, a surface modification compound having polymerizable unsaturated groups besides the first functional group(s) may be mentioned as a suitable one.

Meanwhile, by allowing a second reactive functional group to be contained in the molecular residues of the surface modification compound and by the aid of the second reactive functional group, the reactive functional group (a) reactive with the binder component (B) may be introduced onto the surface of the reactive inorganic fine particle (A) (i). For example, it is preferable to introduce the reactive functional group (a) reactive with the binder component (B) in such a manner that a group capable of hydrogen bonding (hydrogen bond-forming group) such as a hydroxyl group or oxy group is introduced as the second reactive functional group so that the hydrogen bond-forming group is introduced onto the surface of the fine particle and further reacts with a hydrogen bond-forming group of a different surface modification compound. That is, as a suitable example, there may be mentioned use of a compound having a hydrogen bond-forming group in combination with a compound having the reactive functional group (a) reactive with the binder component (B) (such as a polymerizable unsaturated group) and a hydrogen bond-forming group as the surface modification compound.

Specific examples of the hydrogen bond-forming group include functional groups such as a hydroxyl group, carboxyl group, epoxy group, glycidyl group and amide group, and one capable of having an amide bond. The amide bond herein refers to one containing —NHC(O) or >NC(O)— in the binding unit thereof. As the hydrogen bond-forming group used in the surface modification compound of the present invention, a carboxyl group, hydroxyl group or amide group is particularly preferred.

The surface modification compound used for the reactive inorganic fine particle (A) (i) preferably has a molecular weight of 500 or less, more preferably 400 or less, even more preferably 200 or less. Because of having such a low molecular weight, the surface modification compound is presumed to be able to rapidly cover the surface of the inorganic fine particles, so that the inorganic fine particles are prevented from aggregation.

The surface modification compound used for the reactive inorganic fine particle (A) (i) is preferably liquid in the reaction condition for surface modification, and it is preferable that the compound is soluble or at least can be emulsified in a dispersion medium. Particularly, it is preferable that the surface modification compound can be dissolved in a dispersion medium to exist as molecules or molecular ions dispersed uniformly in the dispersion medium.

The saturated or unsaturated carboxylic acid preferably has 1 to 24 carbon atoms. Examples thereof include formic acid, acetic acid, propionic acid, butyric acid, valeric acid, caproic acid, acrylic acid, methacrylic acid, crotonic acid, citric acid, adipic acid, succinic acid, glutaric acid, oxalic acid, maleic acid, fumaric acid, itaconic acid and stearic acid, and acid anhydrides, chlorides, esters and amides corresponding thereto, such as caprolactam. The carboxylic acid includes one with a carbon chain blocked by a O-group, S-group or NH-group. Particularly preferable examples include ether carboxylic acid such as monoether carboxylic acid and polyether carboxylic acid, corresponding acid anhydrides thereof, esters and amides (e.g. methoxyacetic acid, 3,6-dioxa hepatanoate and 3,6,9-trioxa decanoate). Further, it is possible to introduce polymerizable unsaturated groups by using an unsaturated carboxylic acid.

An example of preferred amine is one having the chemical formula $Q_{3-n}NH_n$ (n=0, 1 or 2), wherein the residue Q independently represents an alkyl (such as methyl, ethyl, n-propyl, i-propyl and butyl) having 1 to 12 carbon atoms, more preferably 1 to 6 carbon atoms, even more preferably 1 to 4 carbon atoms, and an aryl, alkaryl or aralkyl (such as phenyl, naphthyl, tolyl and benzyl) having 6 to 24 carbon atoms. Also, an example of preferred amine is polyalkyleneamine. Specific examples thereof include methylamine, dimethylamine, trimethylamine, ethylamine, aniline, N-methylaniline, diphenylamine, triphenylamine, toluidine, ethylenediamine and diethylenetriamine.

The β-dicarbonyl compound is preferably one having 4 to 12 carbon atoms, particularly preferably 5 to 8 carbon atoms, such as diketone (acetylacetone, etc.), 2,3-hexanedione, 3,5-heptanedione, acetoacetic acid, acetoacetic acid-$C_1$-$C_4$-alkyl ester (acetoacetic acid ethyl ester, etc.), diacetyl and acetonylacetone.

Examples of the amino acid include β-alanine, glycine, valine, amino caproic acid, leucine and isoleucine.

Preferred silane is hydrolyzable organosilane having at least one hydrolyzable group or hydroxy group and at least one nonhydrolyzable residue. Examples of the hydrolyzable group include a halogen, alkoxy group and acyloxy group. As the nonhydrolyzable residues, nonhydrolyzable residues having the reactive functional groups (a) and/or having no reactive functional groups (a) is used.

The silane used herein is not particularly limited and may be, for example, $CH_2=CHSi(OOCCH_3)_3$, $CH_2=CHSiCl_3$, $CH_2=CHSi(OC_2H_5)_3$, $CH_2=CH-Si(OC_2H_4OCH_3)_3$, $CH_2=CH-CH_2-Si(OC_2H_5)_3$, $CH_2=CH-CH_2-Si(OOCCH_3)_3$, γ-glycidyloxypropyltrimethoxysilane (GPTS), γ-glycidyloxypropyldimethylchlorosilane, 3-aminopropyltrimethoxysilane (APTS), 3-aminopropyltriethoxysilane (APTES), N-(2-aminoethyl)-3-aminopropyltrimethoxysilane, N—[N'-(2'-aminoethyl)-2-aminoethyl]-3-aminopropyltrimethoxy silane, hydroxymethyltrimethoxysilane, 2-[methoxy(polyethyleneoxy)propyl]trimethoxysilane, bis-(hydroxyethyl)-3-aminopropyltriethoxysilane, N-hydroxyethyl-N-methylaminopropyltriethoxysilane, 3-(meth)acryloxypropyltriethoxysilane and 3-(meth)acryloxypropyltrimethoxysilane.

As the metallic compound having functional groups, there may be mentioned a metallic compound of a metal M selected from the primary groups III to V and/or the secondary groups II to IV of the periodical table of the elements. Examples of the metallic compound include zirconium alkoxide and titanium alkoxide, and M (OR)$_4$ (M=Ti or Zr) wherein a part of the OR group is replaced with a β-dicarbonyl compound or a complexing agent such as monocarboxylic acid. In the case of using a compound having a polymerizable unsaturated group (such as methacrylic acid) as the complexing agent, it is possible to introduce polymerizable unsaturated groups.

As the dispersion medium, water and/or an organic solvent is suitably used. A particularly preferred dispersion medium is distilled (pure) water. As the organic solvent, a polar solvent, nonpolar solvent or aprotic solvent is preferred. Examples thereof include alcohols such as aliphatic alcohols having 1 to 6 carbon atoms (in particular, methanol, ethanol, n-(normal) and i-(iso) propanol and butanol); ketones such as acetone and butanone; esters such as ethyl acetate; ethers such as diethyl ether, tetrahydrofuran and tetrahydropyran; amides such as dimethylacetamide and dimethylformamide; sulfoxides and sulfones such as sulfolane and dimethylsulfoxide; and aliphatic (optionally halogenated) hydrocarbons such as pentane, hexane and cyclohexane. These dispersion media may be used as a mixture.

The dispersion medium preferably has a boiling point at which it can be easily removed by distillation (optionally under reduced pressure). Preferred as the dispersion medium is a solvent having a boiling point of 200° C. or less, more preferably 150° C. or less.

In preparation of the reactive inorganic fine particles (A) (i), the concentration of the dispersion medium is normally from 40 to 90 wt %, preferably from 50 to 80 wt %, more preferably from 55 to 75 wt %. The rest of the dispersion is composed of untreated inorganic fine particles and the above surface modification compound. Herein, the weight ratio of the inorganic fine particles to the surface modified compound is preferably from 100:1 to 4:1, more preferably from 50:1 to 8:1, still more preferably from 25:1 to 10:1.

Preparation of the reactive inorganic fine particles (A) (i) is preferably carried out at a temperature from room temperature (about 20° C.) to the boiling point of the dispersion medium. The dispersion temperature is particularly preferably from 50 to 100° C. The dispersion time particularly depends on the kind of raw materials used, and is normally few hours such as 1 to 24 hours.

An embodiment in which, upon preparing the reactive inorganic fine particles (A) (i), the inorganic fine particles are subjected to mechanical reaction pulverization in a dispersion media containing the surface modification compound, and the surface modification compound have at least partially a chemical bond with pulverized colloidal inorganic fine particles, may be used.

The mechanical pulverization is performed generally by, for example, a mill, kneader, cylinder mill or high-speed disperser. Examples of pulverizers suitable for mechanical pulverization include homogenizers, turbo stirrers, mills having separate pulverization tool such as a ball mill, rod mill, dram mill, cone mill, tube mill, autogenous mill, planetary mill, vibration mill and stirrer mill, heavy-roller kneaders, colloid mills and cylinder mills. Among the above, a particularly preferred mill is an agitation ball mill having a motion stirrer and pulverization ball as pulverization means.

Pulverization with pulverization and homogenizing are preferably performed at room temperature. The time is adjusted according to the kind of mixing and a pulverizer being used.

(ii) Inorganic fine particles having a reactive functional group on the surface, in which particles are obtained by bonding metal oxide fine particles being inorganic fine particles that will be cores to a compound containing reactive functional groups (a) that will be introduced onto the inorganic fine particles, groups represented by the following chemical formula (1), and silanol groups or groups that are able to become silanol groups by hydrolysis:

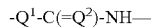
-Q$^1$-C(=Q$^2$)-NH—    Chemical Formula (1)

wherein Q$^1$ is NH, O (oxygen atom) or S (sulfur atom); and Q$^2$ is O or S.

Use of the reactive inorganic fine particle (A) (ii) is advantageous in that the amount of the organic component is increased, so that the dispersibility of the reactive inorganic fine particle (A) and the film strength are further increased.

Firstly, a compound having the reactive functional group (a), which is required to be introduced onto the inorganic fine particle, the group represented by the above chemical formula (1), and a silanol group or a group that is able to become a silanol group by hydrolysis will be described. Hereinafter, this compound may be referred to as a reactive functional group modified hydrolyzable silane.

In the reactive functional group modified hydrolyzable silane, the reactive functional group (a), which is required to be introduced onto the reactive inorganic fine particle, is not particularly limited if it is appropriately selected so as to react with the reactive functional group (b) of the binder component (B). The reactive functional group modified hydrolyzable silane is suitable to introduce the above-mentioned polymerizable unsaturated group.

In the reactive functional group modified hydrolyzable silane, examples of the [-Q$^1$-C(=Q$^2$)-NH—] moiety of the group represented by the above chemical formula (1) include the following six kinds of [—O—C(=O)—NH—], [—O—C(=S)—NH—], [—S—C(=O)—NH—], [—NH—C(=O)—NH—], [—NH—C(=S)—NH—] and [—S—C(=S)—NH—].

They may be used solely or in combination of two or more kinds. Particularly from the viewpoint of thermal stability, it is preferable to use the [—O—C(=O)—NH—] group in combination with at least one of the [—O—C(=S)—NH—] and [—S—C(=O)—NH—] groups. The group represented by the above chemical formula (1), [-Q$^1$-C(=Q$^2$)-NH—], causes appropriate intermolecular cohesion by hydrogen bonding. When a cured product is formed, it is considered possible to impart properties such as excellent mechanical strength, adhesion to the substrate and heat resistance to the product.

Examples of the groups that are able to become silanol groups by hydrolysis include groups having an alkoxy group, aryloxy group, acetoxy group, amino group, halogen atom or the like on a silicon atom thereof. Preferred is an alkoxysilyl group or aryloxysilyl group. The silanol groups or groups that are able to become silanol groups by hydrolysis can be combined to the metal oxide fine particles by a condensation reaction that occurs after a condensation reaction or hydrolysis.

A preferred specific example of the reactive functional group modified hydrolyzable silane may be compounds represented by the following chemical formula (2).

Chemical formula (2)

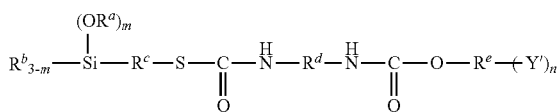

In the chemical formula (2), R$^a$ and R$^b$ may be the same or different from each other, and are a hydrogen atom or a C$_1$-C$_8$ alkyl or aryl group such as a methyl, ethyl, propyl, butyl, octyl, phenyl and xylyl group; and m is 1, 2 or 3.

Examples of the group represented by [(R$^a$O)$_m$R$^b_{3-m}$Si—] include a trimethoxysilyl group, triethoxysilyl group, triphenoxysilyl group, methyldimethoxysilyl group and dimethylmethoxysilyl group. Among these groups, preferred are trimethoxysilyl and triethoxysilyl groups.

In the chemical formula (2), R$^c$ is a C$_1$-C$_{12}$ divalent organic group having an aliphatic or aromatic structure, and may contain a chain, branched or cyclic structure. Examples of such an organic group include methylene, ethylene, propylene, butylene, hexamethylene, cyclohexylene, phenylene, xylylene and dodecamethylene. Among the above, preferred are methylene, propylene, cyclohexylene and phenylene.

Also, R$^d$ is a divalent organic group and is normally selected from divalent organic groups having a molecular weight of 14 to 10,000, preferably a molecular weight of 76 to 500. The examples include a chain polyalkylene group such as hexamethylene, octamethylene and dodecamethylene; an alicyclic or polycyclic divalent organic group such as cyclohexylene and norbornylene; a divalent aromatic group such as phenylene, naphthylene, biphenylene and polyphenylene; and alkyl group-substituted derivatives and aryl group-substituted derivatives thereof. These divalent organic groups may contain an atom group that contains an element other than carbon and hydrogen atom, and may further contain a polyether bond, a polyester bond, a polyamide bond, a polycarbonate bond, and a group represented by the chemical formula (1).

R$^e$ is a (n+1)-valent organic group and is preferably selected from a chain, branched or cyclic saturated or unsaturated hydrocarbon group.

Y' denotes a monovalent organic group having reactive functional groups (a) and may be the above-mentioned reactive functional groups. In the case of selecting the reactive functional groups (a) from polymerizable unsaturated groups, the examples include a (meth)acryloyl(oxy) group, vinyl(oxy) group, propenyl(oxy) group, butadienyl(oxy) group, styryl(oxy) group, ethinyl(oxy) group, cinnamoyl (oxy) group, maleate group and (meth)acrylamide group. Preferably, n is a positive integer of 1 to 20, more preferably 1 to 10, even more preferably 1 to 5.

Synthesis of the reactive functional group modified hydrolyzable silane used in the present invention may be performed by the method disclosed in, for example, JP-A No. 9-100111. That is, for example, if introduction of polymerizable unsaturated groups is required, the synthesis may be performed by: (I) addition reaction between mercaptoalkoxysilane, a polyisocyanate compound and an active hydrogen group-containing polymerizable unsaturated compound reactive with an isocyanate group. The synthesis may be also performed by (II) direct reaction between a compound having an alkoxysilyl group and isocyanate group in a molecule thereof and an active hydrogen group-containing polymerizable unsaturated compound. Furthermore, the reactive, hydrolyzable, functional group modification silane may be directly synthesized by (III) addition reaction between a compound having a polymerizable unsaturated group and isocyanate group in a molecule thereof and mercaptoalkoxysilane or aminosilane.

Examples of mercaptoalkoxysilane suitably used include mercaptopropyltrimethoxysilane and mercaptopropyltriethoxysilane.

Examples of the polyisocyanate compound suitably used include 2,4-tolylene diisocyanate, isophoronediisocyanate, xylenediisocyanate, methylenebis(4-cyclohexyl isocyanateisocyanate) and 1,3-bis(methyl isocyanate) cyclohexane.

Examples of the active hydrogen group-containing polymerizable unsaturated compound include 2-hydroxyethyl (meth)acrylate, 2-hydroxypropyl(meth)acrylate, trimethylolpropane di(meth)acrylate, pentaerythritol tri(meth)acrylate and dipentaerythritol penta(meth)acrylate. Also, compounds obtained by addition reaction between a glycidyl group-containing compound such as alkyl glycidyl ether, allyl glycidyl ether or glycidyl (meth)acrylate and (meth)acrylic acid.

In the production of the reactive inorganic fine particle (A) (ii), a method may be selected from the following: a method in which after the reactive functional group modified hydrolyzable silane is separately hydrolyzed, the resultant and the inorganic fine particles are mixed together, followed by heating and stirring; a method in which the reactive functional group modified hydrolyzable silane is hydrolyzed in the presence of the inorganic fine particles; and a method in which a surface treatment is performed on the inorganic fine particles in the presence of other component such as a polyvalent unsaturated organic compound, a monovalent unsaturated organic compound and a radiation polymerization initiator. Preferred is the method in which the reactive functional group modified hydrolyzable silane is hydrolyzed in the presence of the inorganic fine particles. In the production of the reactive inorganic fine particle (A) (ii), the production temperature is normally from 20° C. to 150° C., and the treating time is in the range from 5 minutes to 24 hours.

To accelerate the hydrolysis reaction, acid, salt or base may be added as a catalyst. Suitable examples of acid include organic acids and unsaturated organic acids; suitable examples of base include tertiary amines and quaternary ammonium hydroxides. The added amount of acid, salt or base catalyst is from 0.001 to 1.0 wt %, preferably from 0.01 to 0.1 wt %, with respect to the reactive functional group modified hydrolyzable silane.

In the first aspect of the invention, the reactive inorganic fine particles (A) may be one not containing fluorine. Herein, the state of "not containing fluorine" is preferably the state in which the inorganic fine particles forming cores of reactive inorganic fine particles (A) is not containing fluorine as well as the state in which the organic component covering a part of the surface of the reactive inorganic fine particles (A) is not containing fluorine. In the typical state, fluorine exists on the surface of the reactive inorganic fine particles (A). Specifically, it is not reactive inorganic fine particles (A) subjected to surface treatment by a fluorine-containing surface preparation agent.

The reactive inorganic fine particles (A), the surface of which is subjected to surface treatment by the fluorine-containing surface preparation agent, easily causes phase separation and uneven distribution since the conformability to the curable resin composition for the hard coat layer further decreases. However, in the first aspect of the invention, since the average particle diameter of the reactive inorganic fine particles (A) is set to 30 nm or less, aggregation of the reactive inorganic fine particles (A) due to uneven distribution of the reactive inorganic fine particles (A) is sufficiently enhanced. Thus, the present invention can form a hard coat layer in which the reactive inorganic fine particles (A) are unevenly distributed at the surface on the air interface side of the hard coat layer to the extent that sufficient hard coating performance can be exhibited without the surface treatment using a fluorine-containing surface preparation agent performed in Patent Literature 1.

It can be confirmed that the reactive inorganic fine particles (A) do not contain fluorine by the following method. That is, it can be confirmed by cutting the hard coat film formed by the reactive inorganic fine particles (A) at, and detecting components contained in the reactive inorganic fine particles (A) by means of TOF-SIMS (Time-of-Flight secondary ion mass spectrograph such as one manufactured by Ulvac-phi, Inc.). If the reactive inorganic fine particles (A) do not contain fluorine, no fluorine atom is detected.

Also, as the reactive inorganic fine particles (A), powdery fine particles containing no dispersion media may be used, but a sol comprising fine particles dispersed in a solvent is preferably used since the dispersion process is not necessary and the productivity is high.

Also, the content of the reactive inorganic fine particle (A) in the hard coat layer is preferably from 10 to 60 wt %, more preferably from 20 to 40 wt %, with respect to the total solid content of the hard coat layer (the total amount of the reactive inorganic fine particle (A) and the constituents of the curable binder system).

By setting the lower limit to 10 wt % or more, the hardness of the surface of the hard coat layer can be sufficiently improved. By setting the upper limit to 60 wt % or less, decrease of film strength and adhesion due to increase of filling ratio of the reactive inorganic fine particles (A) can be prevented.

<Curable Binder System>

Herein, the constituent components of the curable binder system refers to the binder component (B), and if necessary, curable binder components besides the binder component (B), polymer components, and ones to be matrix components of the hard coat layer after being cured hereinafter described such as a polymerization initiator.

(Binder Component (B))

The binder component (B) forming the hard coat layer has the reactive functional group (b) having cross-linkingly reactive with the reactive functional group (a) of the reactive inorganic fine particle (A). The reactive functional group (a) of the reactive inorganic fine particle (A) and the reactive functional group (b) of the binder component (B) are crosslinked to form a mesh structure. It is preferable that the binder component (B) has three or more reactive functional groups (b) per one molecule to obtain sufficient crosslinking ability. As the reactive functional group (b), a polymerizable unsaturated group is suitably used. The preferred examples include photocurable unsaturated groups, and particularly preferred are ionizing radiation-curable unsaturated groups. Specific examples thereof include an ethylenically unsaturated bond, particularly, an ethylene double bond such as a (meth)acryloyl group, vinyl group and allyl group, and an epoxy group.

The binder component (B) is preferably a curable organic resin, which is preferably an optically-transparent resin that can let light through when formed into a coating layer, and may be appropriately selected from three kinds of resins including ionizing radiation-curable resins which are curable upon exposure to ionizing radiation typified by ultraviolet light or electron beams, a mixture of an ionizing radiation-curable resin and a solvent drying type resin (a resin which becomes a film merely by drying a solvent for adjusting solid content upon coating, e.g. thermoplastic resin), and heat-curable resin. The ionizing radiation-curable resins are preferred.

Specific examples of the ionizing radiation-curable resins include compounds having a radically polymerizable functional group such as a (meth)acrylate group, e.g. (meth)acrylate-based oligomers, prepolymers and monomers.

More specific examples of (meth)acrylate-based oligomers and prepolymers include oligomers and prepolymers comprising (meth) acrylic ester of polyfunctional compound such as a polyester resin, a polyether resin, an acrylic resin, an epoxy resin, an urethane resin, an alkyd resin, a spiroacetal resin, a polybutadiene resin, a polythiol polyene resin and polyol having relatively low molecular weight.

Example of the (meth)acrylate monomer, ethyl (meth) acrylate, ethylhexyl (meth)acrylate, hexanediol (meth)acrylate, hexanediol(meth)acrylate, tripropyleneglycol di(meth) acrylate, diethylene glycol di(meth)acrylate, 1,6-hexanediol di(meth)acrylate, neopentyl glycol di(meth)acrylate, trimethylolpropane tri(meth)acrylate, pentaerythritol tri(meth) acrylate, and dipentaerythritol hexa(meth)acrylate.

Examples besides the (meth)acrylate compound include monofunctional and polyfunctional monomers such as styrene, methyl styrene and N-vinylpyrrolidone, and compounds having cationic polymerizable functional group including oligomers and prepolymers such as bisphenol-type epoxy compounds, novolac-type epoxy compounds, aromatic vinyl ethers and aliphatic vinyl ethers.

When the ionizing radiation-curable resin is used as an UV-curable resin, a sensitizer can be added as a photopolymerization initiator or photopolymerization accelerator.

Specific examples of the photopolymerization initiator for resin system having a radically polymerizable functional group include acetophenones, benzophenones, Michler's benzoylbenzoates, α-amiroxym esters, tetramethylthiuram monosulfides, benzoins, benzoinmethylether, thioxanthones, propiophenones, benzyls, acylphosphine oxides and 1-hydroxy-cyclohexyl-phenyl-ketone, which may be used alone or in a mixture. 1-hydroxy-cyclohexyl-phenyl-ketone is available, for example, as Irgacure 184 (product name; manufactured by: Chiba Specialty Chemicals, Inc.). Also, α-aminoalkylphenone is available, for example, as Irgacure 907 or 369 (product names).

For resin system having a cationic polymerizable functional group, an aromatic diazonium salt, an aromatic sulfonium salt, an aromatic iodonium salt, a metacelon compound or benzoinsulfonic acid ester is used alone or in a mixture as the photopolymerization initiator.

It is preferable that a photosensitizer is mixed and used, examples of which include n-butylamine, triethylamine and poly-n-butylphosphine.

The added amount of the photopolymerization initiator is from 0.1 to 10 parts by weight with respect to 100 parts by weight of ionizing radiation-curable composition.

As the solvent drying type resin mixed in the ionizing radiation-curable resin, there may be mainly a thermoplastic resin. A thermoplastic resin generally exemplified can be utilized. By adding the solvent drying type resin, coating defect on a coated surface can be effectively prevented. Specific preferable examples of the thermoplastic resin include styrene-based resins, (meth)acrylic resins, organic acid vinyl ester-based resins, vinyl ether-based resins, halogen-containing resins, olefin-based resins (including cycloaliphatic olefin-based resins), polycarbonate-based resins, polyester-based resins, polyamide-based resins, thermoplastic polyurethane resins, polysulfone-based resins (e.g. polyethersulfone and polysulfone), polyphenylene ether-based resins (e.g. a polymer of 2,6-xylenol), cellulosederivatives (e.g. cellulose esters, cellulosecarbamates and cellulose ethers), silicone resin (e.g. polydimethylsiloxane, polymethylphenylsiloxane), and rubbers or elastomers (e.g. diene-based rubbers such as polybutadiene and polyisoprene, styrene-butadiene copolymers, acrylonitrile-butadiene copolymers, acrylic rubbers, urethane rubbers and silicone rubbers).

Examples of the heat-curable resin include phenolic resins, urea resins, diallyl phthalate resins, melamine resins, guanamine resins, unsaturated polyester resins, polyurethane resins, epoxy resins, aminoalkyd resins, melamine-urea cocondensation resins, silicon resins and polysiloxane resins. When using the heat-curable resin, if necessary, a crosslinking agent, a curing agent such as a polymerization initiator, a polymerization accelerator, a solvent, a viscosity modifier, etc. may be added and used.

Furthermore, from the viewpoint of increasing the hardness of the hard coat layer, it is preferable to use a polyalkylene oxide chain-containing polymer (A) represented by the following chemical formula (3) in combination with the compound (B) having a molecular weight of less than 10,000 and two or more reactive functional groups.

Chemical formula (3)

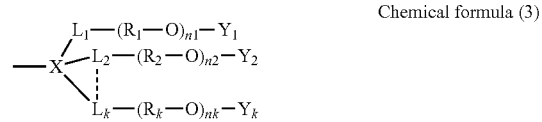

wherein X is a straight, branched or cyclic hydrocarbon chain solely or a combination thereof; the hydrocarbon chain may have a substituent; a heteroatom may be contained between the hydrocarbon chains; the hydrocarbon chain is a trivalent or more organic group having 3 to 10 carbon atoms excluding the substituent; k denotes an integer from 3 to 10; each of $L_1$ to $L_k$ is independently a direct bond or a divalent group having one or more kinds of bonds selected from the group consisting of an ether bond, ester bond and urethane bond; each of $R_1$ to $R_k$ is independently a straight-chain or branched hydrocarbon group having 1 to 4 carbon atoms; each of n1, n2 to nk is an independent number; and each of $Y_1$ to $Y_k$ independently denotes a compound residue having one or more reactive functional groups (b).

The polymer (A), the compound (B) and the reactive inorganic fine particles (A) are reactive with each other. It is presumed that because the polymer (A) is cross-linked to the compound (B) and the reactive inorganic fine particles (A), the hard coat film can be imparted with abrasion resistance.

[Polyalkylene Oxide Chain-Containing Polymer (A) Represented by Chemical Formula (3)]

The polyalkylene oxide chain-containing polymer (A) is a polyalkylene oxide chain-containing polymer having a molecular weight of 1,000 or more and three or more reactive functional groups (b) at the end positions thereof, and is represented by the following chemical formula (3).

Chemical formula (3)

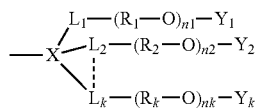

wherein X is a straight, branched or cyclic hydrocarbon chain solely or a combination thereof; the hydrocarbon chain may have a substituent; a heteroatom may be contained between the hydrocarbon chains; the hydrocarbon chain is a trivalent or more organic group having 3 to 10 carbon atoms excluding the substituent; k denotes an integer from 3 to 10; each of $L_1$ to $L_k$ is independently a direct bond or a divalent group having one or more kinds of bonds selected from the group consisting of an ether bond, ester bond and urethane bond; each of $R_1$ to $R_k$ is independently a straight-chain or branched hydrocarbon group having 1 to 4 carbon atoms; each of n1, n2 to nk is an independent number; and each of $Y_1$ to $Y_k$ independently denotes a compound residue having one or more reactive functional groups (b).

In the chemical formula (3), X is a straight, branched or cyclic hydrocarbon chain solely or a combination thereof; the hydrocarbon chain may have a substituent; a heteroatom may be contained between the hydrocarbon chains; and the hydrocarbon chain is a trivalent or more organic group having 3 to 10 carbon atoms excluding the substituent. In the polyalkylene oxide chain-containing polymer (A) represented by the chemical formula (3), X corresponds to a short main chain having k branching point (s) (k denotes the number of the branching point(s)). From the branching point(s), a polyalkylene oxide chain portion $(O-R_k)_{nk}$ is branched, which is a linear side chain.

The hydrocarbon chain contains a saturated hydrocarbon like —$CH_2$— or an unsaturated hydrocarbon like —CH=CH—. The cyclic hydrocarbon chain may comprise an alicyclic compound or aromatic compound. A heteroatom such as O or S may be contained between the hydrocarbon chains, and an ether bond, thioether bond, ester bond, urethane bond or the like may be also contained between the hydrocarbon chains. A hydrocarbon chain that is branched from the straight or cyclic hydrocarbon chain via a heteroatom is included in the number of carbons of a substituent that will be described below.

Specific examples of the substituent that may be contained in the hydrocarbon chain include a halogen atom, hydroxyl group, carboxyl group, amino group, epoxy group, isocyanate group, mercapto group, cyano group, silyl group, silanol group, nitro group, acetyl group, acetoxy group and sulfonic group. The substituent is not limited to the above examples. As mentioned above, the substituent that may be contained in the hydrocarbon chain also contains said hydrocarbon chain that is branched from the straight or cyclic hydrocarbon via a heteroatom, such as an alkoxy group (RO—, wherein R is a straight, branched or cyclic saturated or unsaturated hydrocarbon chain), alkylthioether group (RS—, wherein R is a straight, branched or cyclic saturated or unsaturated hydrocarbon chain) and alkyl ester group (RCOO—, wherein R is a straight, branched or cyclic saturated or unsaturated hydrocarbon chain).

X is a trivalent or more organic group having 3 to 10 carbon atoms excluding the substituent. In X, if the number of the carbon atoms excluding the substituent is less than 3, it becomes difficult to have three or more polyalkylene oxide chain portions $(O-R_k)_{nk}$, which are linear side chains. On the other hand, if the number of the carbon atoms excluding the substituent of X exceeds 10, there are more soft parts in a cured film and the hardness of the film is thus decreased, which is not preferable. The number of the carbon atoms excluding the substituent is preferably 3 to 7, more preferably 3 to 5.

X is not particularly limited if the above conditions are met. As X, for example, there may be mentioned one having any of the following structures.

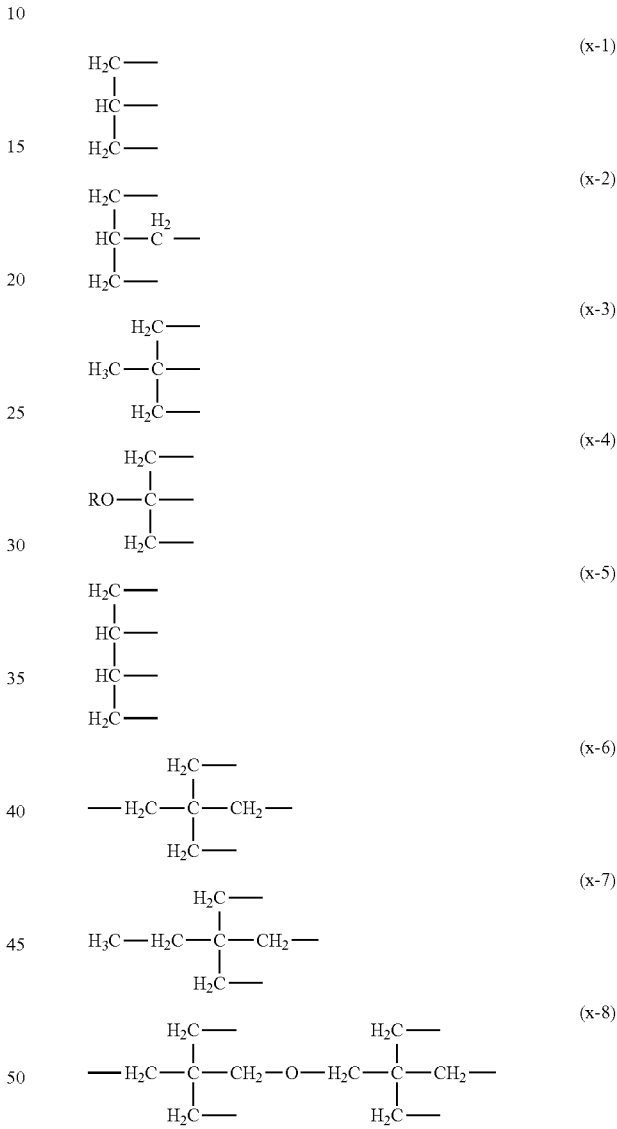

As the particularly preferred structure, there may be mentioned the above structures (x-1), (x-2), (x-3), (x-7), etc.

Materials that are suitably used as the material of X include, for example, polyalcohols which have three or more hydroxyl groups in a molecule thereof and 3 to 10 carbon atoms, such as 1,2,3-propanetriol (glycerol), trimethylolpropane, pentaerythritol and dipentaerythritol; polycarboxylic acids which have three or more carboxyl groups in a molecule thereof and 3 to 10 carbon atoms; and C3-C10 multiamine acids having three or more amino groups in a molecule thereof.

In the chemical formula (3), k denotes the number of the polyalkylene oxide chain $(O-R_k)_{nk}$ in a molecule, which is an integer from 3 to 10. If k is less than 3, that is, if the number of the polyalkylene oxide chain is 2, no sufficient hardness can be obtained. If k exceeds 10, there are more soft parts in a cured film and the hardness of the film is thus decreased, which is not preferable. Preferably, k is 3 to 7. More preferably, k is 3 to 5.

In the chemical formula (3), each of $L_1$ to $L_k$ is independently a direct bond or a divalent group having one or more kinds of bonds selected from the group consisting of an ether bond, ester bond and urethane bond. The divalent group having one or more kinds of bonds selected from the group consisting of an ether bond, ester bond and urethane bond may be an ether bond (—O—), ester bond (—COO—) or urethane bond (—NHCOO—) itself. Because of these bonds, the molecular chain of these bonds can be easily lengthened and is thus highly flexible, so that it is easy to obtain high compatibility with other resin components.

Examples of the divalent group having one or more kinds of bonds selected from the group consisting of an ether bond, ester bond and urethane bond include —O—R—O—, —O(C=O)—R—O—, —O(C=O)—R—(C=O)O—, —(C=O)O—R—O—, —(C=O)O—R—(C=O)O—, —(C=O)O—R—O(C=O)—, —NHCOO—R—O—, —NHCOO—R—O(C=O)NH—, —O(C=O)NH—R—O—, —O(C=O)NH—R—O(C=O)NH—, —NHCOO—R—O(C=O)NH—, —NHCOO—R—(C=O) O—, —O(C=O)NH—R—(C=O) O—, —NHCOO—R—O(C=O)— and —O(C=O)NH—R—O(C=O)—. The R used here denotes a straight, branched or cyclic, saturated or unsaturated hydrocarbon chain.

Specific examples of the divalent group include residues formed by removing active hydrogens from a diol (such as (poly) ethylene glycol and (poly) propylene glycol), dicarboxylic acid (such as fumaric acid, maleic acid and succinic acid), and diisocyanate (such as tolylene diisocyanate, hexamethylene diisocyanate and isophorone diisocyanate). The divalent group is not limited to the above examples.

In the chemical formula (3), $(O-R_k)_{nk}$ is a polyalkylene oxide chain which is a linear side chain having alkylene oxide as the repeating unit. Herein, each of $R_1$ to $R_k$ is independently a straight-chain or branched hydrocarbon group having 1 to 4 carbon atoms. Examples of the alkylene oxide include methylene oxide, ethylene oxide, propylene oxide and isobutylene oxide. Suitably used as the alkylene oxide are ethylene oxide and propylene oxide, which are a straight-chain or branched hydrocarbon group having 2 to 3 carbon atoms.

In the chemical formula (3), each of n1, n2 to nk is the number of the repeating unit of alkylene oxide $R_k$—O, and is an independent number. No particular limitation is imposed on n1, n2 to nk as long as the weight average molecular weight of all the molecules is 1,000 or more. Each of n1, n2 to nk may be different; however, their chain lengths are preferably almost equal from the viewpoint of preventing the hard coat layer from cracking with retaining the original hardness of the hard coat layer when it is formed. Therefore, the difference in the repeating units between n1 to nk is preferably about 0 to 100, more preferably about 0 to 50, even more preferably about 0 to 10.

From the viewpoint of preventing the hard coat layer from cracking with retaining the original hardness of the hard coat layer when it is formed, each of n1, n2 to nk is preferably a number of 2 to 500, more preferably a number of 2 to 300.

Each of $Y_1$ to $Y_k$ independently denotes a reactive functional group b or a compound residue having one or more reactive functional groups (b). Because of this, three or more reactive functional groups (b) are provided to the end positions of the polyalkylene oxide chain-containing polymer.

In the case where each of $Y_1$ to $Y_k$ is a reactive functional group b itself, as each of $Y_1$ to $Y_k$, for example, there may be mentioned a polymerizable unsaturated group such as a (meth)acryloyl group.

In the case where each of $Y_1$ to $Y_k$ is a compound residue having one or more reactive functional groups (b), examples of the reactive functional groups include polymerizable unsaturated groups such as a (meth)acryloyl group, (meth)acryloyloxy group, vinyl group ($CH_2$=CH—), and $CH_2$=CR— (wherein R is a hydrocarbon group). No particular limitation is imposed on the compound residue as long as the reactive functional groups (b) are appropriately selected so as to be reactive with the reactive inorganic fine particles (A) and/or the compound (B) that will be described below. In the case where each of $Y_1$ to $Y_k$ is a compound residue, the number of the reactive functional group (s) b of $Y_1$ to $Y_k$ may be one. However, from the viewpoint of hardness of the resulting hard coat layer, the number is more preferably two or more, so that the cross-linking density of the hard coat layer is increased further.

In the case where each of $Y_1$ to $Y_k$ is a compound residue having one or more reactive functional groups (b), the compound residue is a residue formed by removing the reactive substituent or a part of the reactive substituent (such as hydrogen) from a compound which has at least one or more reactive functional groups (b) and a different reactive substituent.

Specific examples of a compound residue having an ethylenically unsaturated group include residues formed by removing, from each of the following compounds, a reactive substituent other than the ethylenically unsaturated group or a part of the reactive substituent (such as hydrogen) such as (meth) acrylic acid, hydroxyethyl (meth)acrylate, hydroxypropyl (meth)acrylate and pentaerythritol tri(meth)acrylate, but may not be limited thereto.

The molecular weight of the polyalkylene oxide chain-containing polymer (A) used in the present invention is 1,000 or more, preferably 5,000 or more, more preferably 10,000 or more, from the viewpoint of imparting flexibility to a cured layer and preventing the same from cracking.

Examples of commercial products containing the polyalkylene oxide chain-containing polymer (A) represented by the chemical formula (3) include BEAMSET 371 (product name; manufactured by Arakawa Chemical Industries, Ltd.), DIABEAM UK-4153 (product name; manufactured by: Mitsubishi Rayon Co., Ltd.; in the chemical formula (3), X is (x-7); k is 3; each of $L_1$ to $L_3$ is a direct bond; each of $R_1$ to $R_3$ is ethylene; the total of n1, n2 and n3 is 20; and each of $Y_1$ to $Y_3$ is an acryloyloxy group.).

The content of the polymer (A) is preferably 5 to 100 parts by weight, more preferably 10 to 50 parts by weight, with respect to 100 parts by weight of the compound (B) that will be described below. If the content of the polymer (A) is 5 parts by weight or more with respect to 100 parts by weight of the polymer (B), flexibility and stability can be imparted to a cured film. If the content is 100 parts by weight or less, a cured film can retain its hardness.

[Compound (B) Having a Molecular Weight of Less than 10,000 and Two or More Reactive Functional Groups (B)]

The compound (B) having a molecular weight of less than 10,000 and two or more reactive functional groups (b) increases the hardness of the hard coat layer in corporation with the reactive inorganic fine particles (A), thereby imparting sufficient abrasion resistance and hardness to the hard coat layer. One having the structure of the polymer (A) is, however, excluded from the compound (B) having a molecular weight of less than 10,000 and two or more reactive functional groups (b).

In the present invention, the compound (B) may be selected from a wide range of compounds having sufficient abrasion resistance and reactive functional groups (b) which are, when combined with the polymer (A) and the reactive inorganic fine particles (A), reactive with them. The compound (B) may be a single compound or a mixture of two or more kinds of compounds.

In the compound (B) having a molecular weight of less than 10,000 and two or more reactive functional groups (b), from the viewpoint of increasing the cross-linking density of a cured film and imparting hardness to the film, the number of the functional groups b which are contained in one molecule is preferably three or more. When the compound (B) is an oligomer having a molecular weight distribution, the number of the reactive functional groups (b) is expressed by an average number.

The molecular weight of the compound (B) is preferably less than 5,000 from the viewpoint of increasing the hardness of the hard coat layer.

Specific examples of the compound (B) are listed below. However, the compound (B) used in the present invention is not limited to the following examples.

Specific examples of the compounds having polymerizable unsaturated groups include polyfunctional (meth)acrylate monomers having two or more polymerizable unsaturated groups in a molecule including difunctional (meth)acrylate compounds such as 1,6-hexanediol di(meth)acrylate, neopentyl glycol di(meth)acrylate, ethylene glycol di(meth)acrylate, and isocyanuric acid ethylene oxide-modified di(meth)acrylate; trifunctional (meth)acrylate compounds such as trimethylolpropane tri(meth)acrylate and EO—, PO—, and epichlorohydrin-modified products thereof, pentaerythritol tri(meth)acrylate, glycerol tri(meth)acrylate and EO—, PO—, and epichlorohydrin-modified products thereof, isocyanuric acid EO-modified tri(meth)acrylate (e.g. ARONIXM-315 (product name; manufactured by: TOAGOSEI Co., Ltd.), tris(meth)acryloyl oxyethyl phosphate, phthalic acid-hydrogen-(2,2,2-tri-(meth)acryloyloxymethyl) ethyl, and glycerol tri(meth)acrylate and EO—, PO—, and epichlorohydrin-modified products thereof; tetrafunctional (meth)acrylate compounds such as pentaerythritol tetra (meth)acrylate and EO—, PO—, and epichlorohydrin-modified products thereof, and ditrimethylolpropane tetra(meth)acrylate; pentafunctional (meth)acrylate compounds such as dipentaerythritol penta(meth)acrylate and EO—, PO—, epichlorohydrin-, fatty acid-, alkyl-, and urethane-modified products thereof; hexafunctional (meth)acrylate compounds such as dipentaerythritol hexa(meth)acrylate and EO—, PO—, epichlorohydrin-, fatty acid-, alkyl-, and urethane-modified products thereof, and sorbitol hexa(meth)acrylate and EO—, PO—, epichlorohydrin-, fatty acid-, alkyl-, and urethane-modified products thereof.

Also, the examples include (meth)acrylate oligomers (or prepolymers) include epoxy (meth)acrylate obtained by addition reaction of glycidyl ether with (meth) acrylic acid or a monomer having a carboxylic acid base; urethane (meth) acrylate obtained by addition reaction of a reactant of polyol and polyisocyanate with (meth)acrylate having a hydroxyl group; polyester acrylate obtained by esterification of polyester polyol obtained from polyol and polyprotic acid with (meth)acrylic acid; and polybutadiene (meth)acrylate which is a (meth) acrylic compound having polybutadiene or a hydrogenated butadiene skeleton. If the reactive functional groups (b) of an essential component of the present invention are polymerizable unsaturated groups, urethane (meth)acrylate is particularly suitably used since it can impart hardness and flexibility to a cured film.

Examples of glycidyl ether used in the epoxy (meth)acrylate include 1,6-hexanediglycidyl ether, polyethyleneglycol glycidyl ether, bisphenol A type epoxy resins, naphthalene type epoxy resins, cardo epoxy resins, glycerol triglycidyl ether and phenolic novolac type epoxy resins.

Examples of polyol used in the urethane (meth)acrylate include 1,6-hexanediglycidyl ether, polyethylene glycol, polypropylene glycol, polytetramethylene glycol, polycaprolactone diol, polycarbonate diol, polybutadiene polyol and polyester diol. Examples of polyisocyanate used in the urethane (meth)acrylate include tolylene diisocyanate, xylylene diisocyanate, diphenylmethane diisocyanate, tetramethylxylene diisocyanate, hexamethylene diisocyanate, isophorone diisocyanate and dicyclohexylmethane diisocyanate. Examples of (meth)acrylate having a hydroxyl group used in the urethane (meth)acrylate include 2-hydroxyethyl(meth)acrylate, 2-hydroxypropyl(meth)acrylate, 4-hydroxybutyl (meth)acrylate, pentaerythritol (meth)acrylate and caprolactone-modified 2-hydroxyethyl(meth)acrylate.

Examples of polyol used to produce the polyester polyol used in the polyester acrylates include ethylene glycol, polyethylene glycol, propylene glycol, polypropylene glycol, neopentyl glycol, 1,4-butanediol, trimethylolpropane and pentaerythritol. Examples of the polyprotic acid include succinic acid, adipic acid, sebacic acid, phthalic acid, isophthalic acid, terephthalic acid, trimellitic acid and pyromellitic acid.

As the compound (B) used in the present invention, a polymer represented by the following chemical formula (4) and having a molecular weight of less than 10,000 may be also used.

Chemical formula (4)

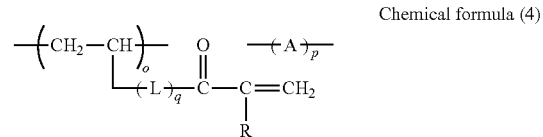

wherein L denotes a linking group having 1 to 10 carbon atoms; q denotes 0 or 1; R denotes a hydrogen atom or methyl group; A denotes the polymeric unit of an optional vinyl monomer and may comprise a single component or a plurality of components; each of o and p denotes mol % of each polymeric unit; and p may be 0.

L in the chemical formula (4) denotes a linking group having 1 to 10 carbon atoms, preferably a linking group having 1 to 6 carbon atoms, more preferably a linking group having 2 to 4 carbon atoms. L may have a straight-chain, branched or cyclic structure. L may have a hetero atom selected from O, N and S.

Preferred examples of the linking group L in the chemical formula (4) include *-$(CH_2)_2$—O-**, *-$(CH_2)_2$—NH-**, *-$(CH_2)_4$—O-**, *-$(CH_2)_6$—O-**, *-$(CH_2)_2$—O—$(CH_2)_2$—O-**, *-CONN— $(CH_2)_3$—O-**, *-$CH_2$CH(OH)$CH_2$—O-** and *-$CH_2CH_2$OCONH$(CH_2)_3$—O-**. The * used here represents a site linked to the main chain of the polymer, and the ** represents a site linked to a (meth) acryloyl group.

In the chemical formula (4), R denotes a hydrogen atom or methyl group. From the viewpoint of curing reactivity, R is preferably a hydrogen atom.

In the chemical formula (4), o may be 100 mol %, that is, a single polymer. Also, o may be 100 mol % or a copolymer produced by mixing two or more kinds of polymeric units which are represented by o mol % and contain a (meth) acryloyl group. The ratio of o top is not particularly limited and may be appropriately selected from the viewpoints of hardness, solubility in a solvent, optical transparency, etc.

In the chemical formula (4), A means the polymeric unit of an optional vinyl monomer. A is not particularly limited and may be appropriately selected from the viewpoints of hardness, solubility in a solvent, optical transparency, etc. Furthermore, A may comprise a single vinyl monomer or a plurality of vinyl monomers depending on the intended purpose.

Examples of the vinyl monomer include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as methyl (meth)acrylate, ethyl (meth)acrylate, hydroxyethyl (meth) acrylate, glycidyl methacrylate, allyl(meth)acrylate and (meth)acryloyloxypropyltrimethoxysilane; styrene derivatives such as styrene and p-hydroxymethylstyrene; unsaturated carboxylic acids such as crotonic acid, maleic acid and itaconic acid; and derivatives thereof.

As the compound (B), reactive oligomers may be used, which have a weight average molecular weight of less than 10,000 and an ethylenically unsaturated bond at the end positions thereof or as a side chain thereof. Examples of the reactive oligomers include resins having, as the framework component, any of poly(methyl (meth)acrylate), polystyrene, poly(butyl (methacrylate), poly(acrylonitrile/styrene), poly (2-hydroxymethyl (meth)acrylate/methyl (meth)acrylate), poly(2-hydroxymethyl (meth)acrylate/butyl (meth)acrylate), and copolymers of these resins with a silicone resin.

As the above-mentioned compounds, commercial products may be used. Examples of urethane acrylates which have a weight average molecular weight of less than 10,000 and two or more polymerizable unsaturated groups include AH-600, AT-600, UA-306H, UA-306T and UA-306I (product names; manufactured by: Kyoeisha Chemical Co., Ltd.); UV-1700B, UV-3000B, UV-3200B, UV-6300B, UV-6330B and UV-7000B (product names; manufactured by: Nippon Synthetic Chemical Industry Co., Ltd.); BEAMSET 500 series (502H, 504H, 550B; product name; manufactured by: Arakawa Chemical Industries, Ltd.); U-6HA, U-15HA and UA-32P, U-324A (product names; manufactured by: Shin-Nakamura Chemical Co., Ltd.); and M-9050 (product name; manufactured by: Toagosei Co., Ltd.). Among the above, examples of urethane (meth)acrylate that is suitably used in combination with the polymer (A) of the present invention include urethane (meth)acrylate which is obtained by the reaction between a monomer or multimer of isophorone diisocyanate, pentaerythritol polyfunctional acrylate and dipentaerythritol polyfunctional acrylate. Commercial products of the urethane (meth)acrylate include, for example, UV-1700B (product name; manufactured by: Nippon Synthetic Chemical Industry Co., Ltd.).

Examples of epoxy acrylates that have a weight average molecular weight of less than 10,000 and two or more polymerizable unsaturated groups include SP-4060, SP-1450 and so on in the SP series and VR-60, VR-1950, VR-90, VR-1100 and so on in the VR series (product names; manufactured by: Showa Highpolymer Co., Ltd.); UV-9100B, UV-9170B and so on (product names; manufactured by: Nippon Synthetic Chemical Industry Co., Ltd.); and EA-6320/PGMAc, EA-6340/PGMAc and so on (product names; manufactured by: Shin-Nakamura Chemical Co., Ltd.).

Examples of reactive oligomers that have a weight average molecular weight of less than 10,000 and two or more polymerizable unsaturated groups include AA-6, AS-6, AB-6, and AA-714SK in the Macromonomer series (product names; manufactured by: TOAGOSEI Co., Ltd.).

(Polymerization Initiator)

To initiate or promote the polymerization of the above-mentioned radical polymerizable functional group or cationic polymerizable functional group, a radical polymerization initiator, a cationic polymerization initiator, a radical and cationic polymerization initiator or the like may be appropriately selected for use, if necessary. These polymerization initiators decompose by light irradiation and/or heating to produce radicals or cations, thereby promoting radical polymerization or cationic polymerization.

The radical polymerization initiator may be any radical polymerization initiator capable of releasing a substance which can initiate radical polymerization by light irradiation and/or heating. Examples of photo-radical polymerization initiators include imidazole derivatives, bisimidazole derivatives, N-aryl glycine derivatives, organic azide compounds, titanocenes, aluminate complexes, organic peroxides, N-alkoxypyridinium salts and thioxanthone derivatives. Specific examples include 1,3-di(tert-butyldioxycarbonyl)benzophenone, 3,3',4,4'-tetrakis(tert-butyldioxycarbonyl)benzophenone, 3-phenyl-5-isoxazolone, 2-mercapto benzimidazole, bis(2,4,5-triphenyl)imidazole, 2,2-dimethoxy-1,2-diphenylethane-1-on (product name: Irgacure 651; manufactured by: Chiba Specialty Chemicals, Inc.), 1-hydroxy-cyclohexyl-phenyl-ketone (product name: Irgacure 184; manufactured by: Chiba Specialty Chemicals, Inc.), 2-benzyl-2-dimethylamino-1-(4-morpholinophenyl)-butane-1-on (product name: Irgacure 369; manufactured by: Chiba Specialty Chemicals, Inc.), bis($\eta$5-2,4-cyclopentadiene-1-yl)-bis(2,6-difluoro-3-(1H-pyrrole-1-yl)-phenyl)titanium) (product name: Irgacure 784; manufactured by: Chiba Specialty Chemicals, Inc.), but may not be limited thereto.

The cationic polymerization initiator may be any cationic polymerization initiator capable of releasing a substance which can initiate cationic polymerization by light irradiation and/or heating. Examples of the cationic polymerization initiator include sulfonic esters, imide sulfonates, dialkyl-4-hydroxysulfonium salts, arylsulfonic acid-p-nitrobenzyl esters, silanol-aluminum complexes and ($\eta$6-benzene)($\eta$5-cyclopentadienyl)iron(II), and specific examples include benzointosylate, 2,5-dinitro benzyl tosylate and N-tosil-phthalic imide, but may not be limited thereto.

Examples of the polymerization initiator that can be used as both radical polymerization initiator and cationic polymerization initiator include aromatic iodonium salts, aromatic sulfonium salts, aromatic diazonium salts, aromatic phosphonium salts, triazine compounds and iron arene complexes, and specific examples include iodonium salts such as chloride, bromide or borofluoride salts, hexafluorophosphate salts and hexafluoroantimonate salts of iodonium such as diphenyliodonium, ditolyliodonium, bis(p-tert-butylphenyl)iodonium and bis(p-chlorophenyl)iodonium; sulfonium salts such as chloride, bromide or borofluoride salts, hexafluorophosphate salts and hexafluoroantimonate salts of sulfonium such as triphenylsulfonium, 4-tert-butyltriphenylsulfonium and tris(4-methylphenyl)sulfonium; and 2,4,6-substituted-1,3,5-triazine compounds such as 2,4,6-tris(trichloromethyl)-1,3, 5-triazine, 2-phenyl-4,6-bis(trichloromethyl)-1,3,5-triazine and 2-methyl-4,6-bis(trichloromethyl)-1,3,5-triazine, but may not be limited thereto.

[Other Components]

In addition to the above essential components, an antistatic agent and anti-glare agent may be accordingly added to the hard coat layer. Furthermore, various kinds of additives such as a reactive or non-reactive leveling agent and various kinds of sensitizers may be mixed. In the case of containing an anti-static agent and/or anti-glare agent, the anti-static properties and/or anti-glare properties may be further imparted to the hard coat layer of the present invention.

Hereinafter, the production method of the hard coat film of the present invention will be explained.

As an embodiment of the hard coat film of the present invention, there may be a hard coat film wherein a photocurable binder system is used as a curable binder system containing binder component (B), and the hard coat layer is formed by coating the curable resin composition for the hard coat layer in which the reactive inorganic fine particles (A) are added to the photocurable binder system is coated on the observer side surface of the transparent substrate film.

The hard coat layer can be formed by coating the curable resin composition for the hard coat layer, obtained by mixing the reactive inorganic fine particles (A) and constituents of the photocurable binder system in an appropriate solvent, on the transparent substrate film.

<Preparation of Curable Resin Composition for Hard Coat Layer>

The curable resin composition for the hard coat layer is prepared by mixing and dispersing the above components according to a general preparation method. For mixing and dispersing, a paint shaker or a bead mill may be used. When the reactive inorganic fine particles (A) are obtained in the state of being dispersed in a solvent, the curable resin composition for the hard coat layer is prepared by adding the curable binder system and other components including solvent accordingly thereto in the dispersed state, and mixing the resultant solution to disperse.

Examples of the solvent include alcohols such as isopropyl alcohol, methanol, ethanol, butanol and isobutylalcohol; ketones such as methyl ethyl ketone (MEK), methyl isobutyl ketone (MIBK) and cyclohexanone; esters such as methyl acetate, ethyl acetate and butyl acetate; halogenated hydrocarbons such as chloroform, methylene chloride and tetrachloroethane; aromatic hydrocarbon such as toluene and xylene; and mixtures thereof.

According to the preferred embodiment of the first aspect of the invention, it is preferable a leveling agent other than fluorine-containing compounds such as a silicone-based leveling agent is added to the curable resin composition for the hard coat layer. The composition for coating having the leveling agent added can impart coating stability, slidability and anti-fouling properties to the surface of a coating layer upon coating or drying, and the effect of abrasion resistance can be imparted.

<Coating of Curable Resin Composition for Hard Coat Layer>

Examples of methods of coating the curable resin composition for the hard coat layer on the transparent substrate film include the roll coating method, Meyer bar coating method, and the gravure coating method. After coating the curable resin composition for the hard coat layer, drying and UV curing are performed. By drying the curable resin composition for the hard coat layer for several tens of seconds to several tens of minutes after coating, reactive inorganic fine particles (A) are unevenly distributed on the air interface side and aggregate. Examples of light source of ultraviolet ray include a super high pressure mercury lamp, a high pressure mercury lamp, a low pressure mercury lamp, a carbon-arc lamp, a black-light fluorescent light and a metal halide lamp. As the wavelength of the ultraviolet ray, the wavelength region of 190 to 380 nm can be used. Specific examples of sources of electron beam include Cock-croft type, Van de Graaff type, resonance transformer type, insulating core transformer type, linear type, Dynamitron type or high-frequency type electron beam accelerators.

By curing the constituents of the photocurable binder system, the reactive functional groups (a) of the reactive inorganic fine particles (A) and the reactive functional group (b) of the binder component (B) contained in the constituents of the photocurable binder system are crosslinked to form a mesh structure. Thus, a hard coat layer is formed.

In the case of forming the hard coat layer by the curable resin composition for the hard coat layer, it is preferable to cure the curable resin composition for the hard coat layer by the gel fraction of from 30% to 80%, in which more preferable lower limit is 35% or more, even more preferably 40% or more, and more preferable upper limit is 70% or less, even more preferably 60% or less, from the viewpoint of excellent adhesion between the hard coat layer and the transparent substrate film, and excellent abrasion resistance.

The gel fraction can be obtained, for example, by the following method when the composition is an ultraviolet curing resin. Firstly, an ink containing components other than reactive inorganic fine particles (A) such as a monomer, an oligomer, a polymer and other additives among the components of the curable resin composition for the hard coat layer is produced as a sample, and coated on a PET substrate having a thickness of 50 μm by a layer thickness having a thickness of 5 μm. The resultant film is radiated with various UV irradiation conditions in the range from 10 to 100 mJ at intervals of 10 mJ to produce samples. Next, the samples are cut in 10 cm square, and weight X as average of three times of measurement is measured. After the samples are dipped in a solvent capable of solving the monomer (e.g. acetone, methyl ethyl ketone, methyl acetate, toluene, and mixed solvent thereof; in the case of acrylate-based composition, representative examples include acetone and methyl ethyl ketone) for 12 hours or more, each sample is removed from the solvent, sufficiently dried in an oven (60° C.×2 minutes). Then, the weight B of dried sample is measured. A difference of the weight X before dipping in the solvent and the weight Y of dried sample is referred to as Z. Finally, the gel fraction (%) per dose is calculated using the following formula:

$$\text{Gel fraction (\%)}=100-Z/X$$

In the hard coat film of the first aspect of the invention, the layer thickness of the hard coat layer is preferably from 2 μm to 30 μm, more preferably from 5 μm to 20 μm, from the viewpoint of excellent physical properties such as hardness and abrasion resistance, and excellent productivity. By setting the layer thickness to 2 μm or more, sufficient hard coating performance can be imparted, and by setting the layer thickness to 30 μm or less, generation of crack can be prevented.

According to the first aspect of the invention, a hard coat film provided with a hard coat layer having high hard coating performance, so that a scratch is not formed on the surface by the following steel wool scratch test can be provided.

(Steel Wool Scratch Test)

The surface of the hard coat layer is fractioned or rubbed with #0000 steel wool by reciprocating the steel wool with a certain load (e.g. 500 g/cm$^2$) for 10 times at a speed of 50 mm/sec. The stroke width of friction is preferably from 5 to 15 cm.

If there is no scratch visually observed on the surface of the hard coat layer in this test, the steel wool resistance is referred to as 500 g/cm$^2$. If the load is changed to 1,000 g/cm$^2$ and there is no scratch in the test, the steel wool resistance is referred to as 1,000 g/cm$^2$. In the present invention, the steel wool resistance is preferably 500 g/cm$^2$ or more, more preferably 1,000 g/cm$^2$ or more.

<Other Embodiments>

The hard coat film of the present invention is not limited to the embodiment shown in FIG. 1. For example, other layers may be provided on the transparent substrate film 2, and the above described hard coat layer 1 may be provided on such other layers. As such other layers, there may be a layer (hereinafter, it may be referred to as an intermediate layer) comprising a photocurable resin and a heat-curable resin between the transparent substrate film 2 and the hard coat layer 1. By providing the intermediate layer, if the transparent substrate film is thin (e.g. 30 to 50 μm), rigidity insufficient with the transparent substrate film itself can be supplemented. Thereby, the hard coat layer is less likely to largely modify, and the intermediate layer can follow modification of the transparent substrate film to lighten external stress applied to hard coat layer. A plurality of layers may be provided between the transparent substrate film 2 and the hard coat layer 1.

<Other Layers>

The hard coat film of the present invention basically comprises the transparent substrate film and a hard coat layer. However, considering the functions and applications of the hard coat film, the hard coat film of the present invention may contain one or more layers that will be described below besides the hard coat later of the present invention.

Hereinafter, a low refractive index layer will be explained in detail.

[Low Refractive Index Layer]

A low refractive index layer is a layer which lowers reflectance ratio by light interference effect of a multilayer film when external light (e.g. fluorescent lamp, natural light, etc.) reflects on the surface of an optical laminate. In the preferred embodiment of the present invention, the low refractive index layer is preferably formed on the hard coat layer. The low refractive index layer has lower refractive index than that of a layer disposed lower than the low refractive index layer.

In the preferred embodiment of the present invention, the refractive index of the hard coat layer adjacent to the low refractive index layer is 1.5 or more, and the refractive index of the low refractive index layer is 1.45 or less, preferably 1.42 or less.

The low refractive index layer is preferably constituted by one selected from 1) a silica or magnesium fluoride-containing resin, 2) a fluorine-based resin being a low refractive index resin, 3) a silica or magnesium fluoride-containing fluorine-based resin, and 4) a silica or magnesium fluoride thin film. For the resin other than the fluorine resin, a similar resin as one constituting the hard coat layer can be used.

As the fluorine-based resin, a polymerizable compound or its polymer containing a fluorine atom at least in a molecule can be used. The polymerizable compound is not particularly limited, and for example, one having a curable reactive group such as a functional group curable with ionizing radiation or a thermosetting polar group is preferable.

Also, there may be a compound having these reactive groups simultaneously. Contrary to the polymerizable compound, the polymer has no reactive group as above.

As the polymerizable compound having an ionizing radiation-curable group, a fluorine-containing monomer having an ethylenically unsaturated bond can be widely used. The specific examples include fluoroolefins such as fluoroethylene, vinylidene fluoride, tetrafluoroethylene, hexafluoropropylene, perfluorobutadiene and perfluoro-2,2-dimethyl-1,3-dioxole. Examples of a polymerizable compound having a (meth)acryloyl oxy group include (meth)acrylate compounds having a fluorine atom in a molecule such as 2,2,2-trifluoroethyl(meth)acrylate, 2,2,3,3,3-pentafluoropropyl(meth)acrylate, 2-(perfluorobutyl)ethyl(meth)acrylate, 2-(perfluorohexyl)ethyl(meth)acrylate, 2-(perfluorooctyl)ethyl(meth)acrylate, 2-(perfluorodecyl)ethyl(meth)acrylate, methyl α-trifluoromethacrylate and ethyl α-trifluoromethacrylate; and fluorine-containing polyfunctional (meth)acrylic ester compounds having a fluoroalkyl group, a fluorocycloalkyl group or a fluoroalkylene group having 1 to 14 carbons and at least three fluorine atoms, and at least two (meth) acryloyloxy groups in a molecule.

Examples of a preferred heat-curable polar group include groups forming a hydrogen bond such as a hydroxyl group, a carboxyl group, an amino group and an epoxy group, which are not only excellent in adhesion with a coating layer but also in affinity with inorganic super fine particles such as silica. Examples of a polymerizable compound having a heat-curable polar group include 4-fluoroethylene-perfluoroalkylvinyl ether copolymers; fluoroethylene-hydrocarbon-based vinyl ether copolymers; and fluorine-modified products of an epoxy, polyurethane, cellulose, phenolic or polyimide resin.

Examples of a polymerizable compound having both ionizing radiation-curable group and heat-curable polar group include alkyl, alkenyl, aryl esters of partially or completely fluorinated acrylic or methacrylic acid, vinyl ethers of completely or partially fluorinated acrylic or methacrylic acid, vinyl esters of completely or partially fluorinated acrylic or methacrylic acid, and vinyl ketones of completely or partially fluorinated acrylic or methacrylic acid.

Also, together with the polymerizable compound having a fluorine atom or the polymer, each of resin components described in the curable resin composition for the hard coat layer can be mixed and used. Further, a curing agent for curing a reactive group, various additives for improving coatability and imparting anti-fouling properties, and a solvent can be accordingly used.

According to a preferred embodiment of the present invention, "fine particles having voids" are preferably utilized as a low refractive index agent. "Fine particles having voids" can maintain the strength of the low refractive index layer, and decrease the refractive index. In the present invention, "fine particles having voids" means fine particles which have a structure inside of the fine particles being filled with air and/or a porous structure body containing air, and in which the refractive index decreases inversely proportional to the occupancy of air in the fine particles compared to the original refractive index of the fine particles. Also, a fine particle capable of forming a nano porous structure in at least a part of inside and/or surface of the coating layer by a form, structure or aggregated state of the fine particles or a dispersed state of the fine particles inside of the coating layer is included in the present invention. The low refractive index layer using the fine particles can adjust the refractive index from 1.30 to 1.45.

As a preferred specific example of inorganic fine particles having voids, there may be silica fine particles prepared using a technique disclosed in JP-A No. 2001-233611. Also, silica fine particles obtained by the methods disclosed in JP-A No. 7-133105, JP-A No. 2002-79616 and JP-A No. 2006-106714. Since the silica fine particle having voids is easy to produce and the hardness is high, the strength of the low refractive index layer when the layer is formed by mixing the particles and a binder can be improved, and the refractive index can be adjusted in the range from about 1.20 to 1.45. Particularly, as a preferred specific example of organic fine particles having voids, there may be hollow polymer fine particles prepared using a technique disclosed in JP-A No. 2002-80503.

As the fine particles capable of forming a nano porous structure at least apart of inside and/or surface of the coating layer, in addition to the above silica fine particles, there may be a dispersion or aggregate of hollow fine particles, produced for the purpose of enlarging the specific surface area, for incorporating in a slow-release material adsorbing various chemical substances to column for filling and a porous portions on the surface, porous fine particles used for fixing catalyst, an insulator or a low dielectric material. As specific examples thereof, aggregates of porous silica fine particles among commercial products (product names: Nipsil and Nipgel) manufactured by Nihon Silica Kogyo Co., Ltd., and colloidal silica UP series (product name; manufactured by Nissan Chemical Industries, Ltd.) having a structure in which silica fine particles are linked in a chain form, in the preferred particle size of the present invention can be utilized.

The average particle diameter of "fine particles having voids" is from 5 nm to 300 nm, preferably from 8 nm to 100 nm, more preferably from 10 nm to 80 nm. By having the average particle diameter of the fine particles in the above range, excellent transparency can be imparted to the low refractive index layer.

(Formation of Low Refractive Index Layer)

In formation of the low refractive index layer, an appropriate solvent is used if necessary, and the viscosity is preferably from 0.5 to 5 cps (25° C.), more preferably from 0.7 to 3 cps (25° C.), to obtain a preferred coatablity as a resin composition. By appropriately adjusting the viscosity, an antireflection film excellent in visible light ray can be attained, an uniform thin film without coating unevenness can be formed, and the low refractive index layer particularly excellent in adhesion to the substrate can be formed.

The curing means of the resin may be similar as one explained the hard coat layer. In the case of utilizing heating means for curing treatment, for example, thermal polymerization initiator, which starts polymerization of the polymerizable compound generating radicals by heating is preferably added to the fluorine-based resin composition.

Further, the hard coat film of the present invention may be provided with an anti-fouling layer, anti-glare layer and so on hereinafter described.

[Anti-Fouling Layer]

According to the preferred embodiment of the present invention, for the purpose of preventing fouling of the outermost surface of the low refractive index layer, an anti-fouling layer, preferably one having provided with an anti-fouling layer on the surface side opposite to one surface of the substrate film having the low refractive index layer formed, may be provided. The anti-fouling layer can further improve anti-fouling properties and abrasion resistance of the hard coat film.

Specific examples of an anti-fouling agent include fluorine-based compounds and/or silicon-based compounds having low compatibility with a photocurable resin composition having a fluorine atom in a molecule and being difficult to be added to the low refractive index layer, and fluorine-based compounds and/or silicon-based compounds having compatibility with a photocurable resin composition and fine particles having a fluorine atom in a molecule.

[Anti-Glare Layer]

An anti-glare layer may be formed between the transparent substrate film and the hard coat layer or low refractive index layer. The anti-glare layer may be formed by a resin and an anti-glare agent. As the resin, one explained in the hard coat layer can be similarly used.

In the preferred embodiment of the present invention, the anti-glare layer preferably satisfies all of the following formulae, wherein the average particle diameter of the fine particles is R (μm), the maximum value of convex portion of convexoconcave of the anti-glare layer from the substrate surface in vertical direction is Hmax (μm), the average distance of the convexoconcave of anti-glare layer is Sm (μm), and the average inclination angle of the convexoconcave portion is θa:

$8R \leq Sm \leq 30R$, $R < Hmax < 3R$, $1.3 \leq \theta a \leq 2.5$, and $1 \leq R \leq 8$ In another preferred example of the present invention, an anti-glare layer which satisfies $\Delta n = |n1-n2| < 0.1$, wherein the refractive index of fine particles is n1 and the refractive index of resin composition is n2, and the haze value inside of the anti-glare layer is 55% or less is preferable.

As an anti-glare agent, there may be fine particles, the form of which may be a spherical form, an elliptic form, etc., preferably spherical form. There are inorganic and organic fine particles, in which one formed by organic material is preferable. The fine particles preferably have anti-glare properties and transparency.

Specific examples of the fine particles include plastic beads, and one having transparency is preferable. Specific examples of the plastic beads include a styrene bead (refractive index: 1.59), a melamine bead (refractive index: 1.57), an acrylic bead (refractive index: 1.49), an acrylic-styrene bead (refractive index: 1.54), a polycarbonate bead and a polyethylene bead. The added amount of the fine particles is from about 2 to 30 parts by weight, preferably from about 10 to 25 parts by weight, with respect to 100 parts by weight of the transparent resin composition.

The layer thickness (cured) of the anti-glare layer is from 0.1 to 100 μm, preferably from 0.8 to 20 μm. By setting the layer thickness in this range, the anti-glare layer can sufficiently exhibit its function.

<Additives>

The above described layers may further have other function, and may be formed by a composition containing components adding functions, for example, an anti-static agent, a refractive index modifier, an anti-fouling agent and a hardness modifier.

[Anti-Static Agent (Conductive Agent)]

By including the anti-static agent in the above layers, dust attachment on the surface of the optical laminate can be effectively prevented. Specific examples of the anti-static agent include various kinds of cationic compounds having a cationic group, such as a quaternary ammonium salt, pyridinium salt and primary, secondary or tertiary amino group; anionic compounds having an anionic group such as a sulfonic acid base, sulfuric ester base, phosphoric ester base and phosphonic acid base; amphoteric compounds such as an amino acid-based amphoteric compound and aminosulfuric ester-based amphoteric compound; nonionic compounds such as an amino alcohol-based nonionic compound, glycerin-based nonionic compound and polyethylene glycol-based nonionic compound; organometallic compounds such as alkoxides of tin and titanium; and metal chelate compounds such as acetylacetonate salts of the organometallic compounds. Furthermore, compounds produced by increasing the molecular weight of the above compounds may also be mentioned. In addition, as the anti-static agent, there may be used monomers or oligomers which contain a tertiary amino group, quaternary ammonium group or metallic chelate moiety and are polymerizable upon exposure to ionizing radiation, or polymerizable compounds including organometallic compounds which have a functional group and are like a coupling agent.

Also, electroconductive fine particles can be exemplified. Specific examples of the electroconductive fine particles include fine particles of metal oxides. Such metal oxides include, for example, ZnO (refractive index: 1.90; hereinafter, each of the numerical values in parentheses refers to the refractive index), $CeO_2$ (1.95), $Sb_2O_2$ (1.71), $SnO_2$ (1.997), indium tin oxide (often abbreviated as ITO; 1.95), $In_2O_3$ (2.00), $Al_2O_3$ (1.63), antimony-doped tin oxide (abbreviated as ATO; 2.0) and aluminum-doped zinc oxide (abbreviated as AZO; 2.0). The fine particles have a particle diameter of 1 µm or less, i.e. submicron size. The average particle diameter of the electroconductive fine particles is preferably from 0.1 nm to 0.1 µm. By setting the average particle diameter in this range, the electroconductive fine particles dispersed in a binder gives a composition which is able to form a highly transparent layer which causes almost no haze and has excellent total light transmittance. The average particle diameter of the electroconductive metal oxide fine particles can be measured by the dynamic light scattering method.

As the anti-static agent, there may be also used electroconductive polymers. Specifically, examples include aliphatic conjugated polyacetylene, aromatic conjugated poly(paraphenylene), heterocyclic conjugated polypyrrole or polythiophene, heteroatom-containing conjugated polyaniline, mixed conjugated poly(phenylenevinylene). Also, examples include a multi-chain type conjugated system which is a conjugated system having a plurality of conjugated chain in a molecule thereof, and an electroconductive complex which is a polymer formed by graft- or block-copolymerization of said conjugated polymer chain with a saturated polymer.

The added amount of the anti-static agent is preferably from 5 to 250 mass %, more preferably the upper limit is 100 or less and the lower limit is 7 or more, with respect to the amount of the binder resin (excluding the solvent). It is preferable to adjust the added amount to the above range since transparency as an optical laminate can be maintained, and anti-static performance can be imparted without adversely affecting properties such as hard coating performance.

Specific examples of formation of anti-static layer include a method of forming a deposited film by depositing or sputtering electroconductive metal or electroconductive metal oxide on the upper surface of the hard coat layer, and a method of forming a coating layer by coating the resin composition having electroconductive fine particles dispersed in a resin.

In the case of forming the anti-static layer by deposition, examples of the anti-static agent include electroconductive metals and electroconductive metal oxides such as antimony-doped indium tin oxide (hereinafter, it may be referred to as "ATO") and indium tin oxide (hereinafter, it may be referred to as "ITO"). The thickness of the deposited film being the anti-static layer is from 10 nm to 200 nm, more preferably the upper limit is 100 nm or less and the lower limit is 50 nm or more.

The anti-static layer may be formed by a coating liquid containing the anti-static agent. In this case, as the anti-static agent, one explained in the anti-static agent being a function-imparting component can be similarly used. In the case of forming a coating layer using electroconductive fine particles, a curable resin is preferably used. As the curable resin, one used for forming the hard coat layer can be similarly used. To form the coating layer, a coating liquid containing the electroconductive fine particles in the curable resin is coated by a coating method such as the roll coating method, the Meyer bar coating method and the gravure coating method. After coating, drying and UV curing are performed.

In the curing method of the ionizing radiation-curable resin composition, curing is performed by irradiation of electron beam or UV. In the case of curing by electron beam, electron beam having energy of 100 KeV to 300 KeV is used. In the case of UV curing, UV generated by ray from a super high pressure mercury lamp, a high pressure mercury lamp, a low pressure mercury lamp, a carbon-arc lamp, a xenon arc lamp or a metal halide lamp is used.

[Refractive Index Modifier]

By adding a refractive index modifier to the hard coat layer, anti-reflection properties on the surface of the hard coat layer can be adjusted. The refractive index modifier includes a low-refractive index agent, a middle-refractive index agent and a high-refractive index agent.

(1) Low-Refractive Index Agent

The low-refractive index agent has lower refractive index than that of the hard coat layer. In the preferred embodiment of the present invention, one constituted by a hard coat layer having a refractive index of 1.5 or more and a low-refractive index agent having a refractive index of less than 1.5, preferably 1.45 or less.

Specifically, the low-refractive index agent explained in the low refractive index layer can be preferably used. The layer thickness of the low-refractive index agent is preferably 1 µm or more since this layer is the outermost layer and requires abrasion resistance and hardness.

(2) High-Refractive Index Agent/Middle-Refractive Index Agent

The refractive index of the high-refractive index agent and the middle-refractive index agent may be set from 1.46 to 2.00. The middle-refractive index agent means one having a refractive index of 1.46 to 1.80, and the high-refractive index agent means one having a refractive index of 1.65 to 2.00.

As the high-refractive index agent and the middle-refractive index agent, fine particles can be exemplified. The specific examples (refractive index is shown in brackets) include zinc oxide (1.90), titania (2.3 to 2.7), ceria (1.95), tin-doped indium oxide (1.95), antimony-doped tin oxide (1.80), yttria (1.87) and zirconia (2.0).

[Leveling Agent]

The hard coat layer may have a leveling agent added. Examples of preferred leveling agents include fluorine-contained and silicone-contained leveling agents. The curable resin composition for the hard coat layer having the leveling agent added can improve coatability toward the surface of a coating layer upon coating or drying, can impart slidability and anti-fouling properties as well as the effect of abrasion resistance.

[Anti-Fouling Agent]

The hard coat layer may contain an anti-fouling agent. The main purpose of the anti-fouling agent is anti-fouling of the outermost surface of the optical laminate. The anti-fouling agent can further impart abrasion resistance to the optical laminate. Specifically, as the anti-fouling agent, additives that can exhibit water-repellency, oil-repellency and fingerprint wipe-off properties are effected. More specifically, fluorine-based compounds, silicon-based compounds and mixed compounds thereof can be exemplified. Specific examples include silane coupling agents having a fluoroalkyl group such as 2-perfluorooctylethyltriaminosilane, and particularly, one having an amino group can be preferably used.

[Hardness Modifier (High Curing Agent)]

A hardness modifier (high curing agent) may be added to the hard coat layer for the purpose of improving the effect of abrasion resistance. Specific examples of the hardness modifier include ionizing radiation-curable resins containing polyfunctional (meth)acrylate prepolymer such as polyester (meth)acrylate, urethane (meth)acrylate and epoxy (meth) acrylate, or polyfunctional (meth)acrylate monomer of trifunctional or more such as trimethylolpropane tri(meth)acrylate, pentaerythritol tetra(meth)acrylate, dipentaerythritolhexa(meth)acrylate alone or in combination of two or more kinds selected therefrom.

2. Invention of Second Aspect

The hard coat film according to the second aspect of the invention is a hard coat film in which a hard coat layer is provided on a transparent substrate film, wherein the hard coat layer comprises a cured product of a curable resin composition for the hard coat layer containing:

a reactive inorganic fine particle (A) having an average particle diameter of 30 nm to 100 nm, and having a reactive functional group (a) introduced by an organic component, which covers at least a part of a surface of the reactive inorganic fine particle (A), on the surface, and a curable binder system containing a binder component (B) having a reactive functional group (b) cross-linkingly reactive with the reactive functional group (a) of the reactive inorganic fine particle (A), and the curable binder system itself also having curing reactivity; and wherein the reactive inorganic fine particle (A) has density distribution in a thickness direction of the hard coat layer, in which density of the reactive inorganic fine particle (A) is lowest at an interface on a side opposite to a transparent substrate film side of the hard coat layer while the density of the reactive inorganic fine particle (A) is highest at an interface and its vicinity on the transparent substrate film side of the hard coat layer.

Figure 3:
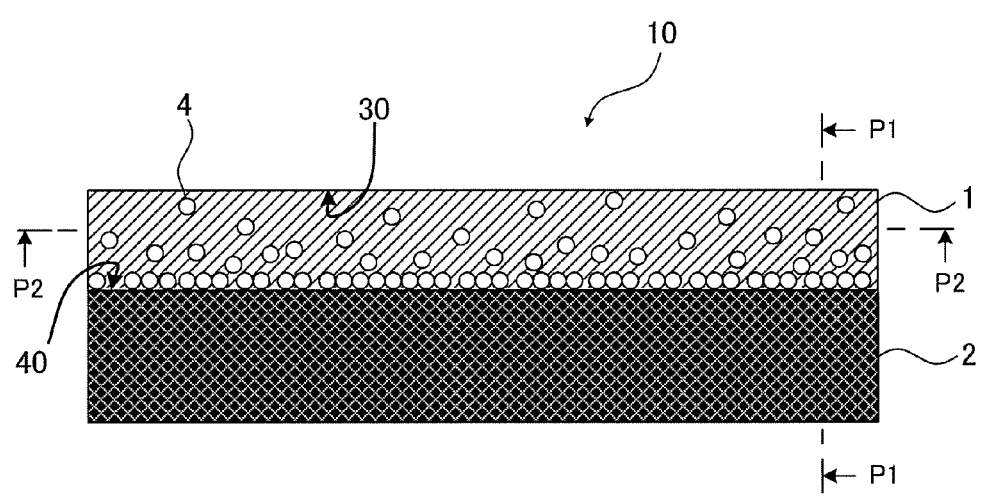
FIG. 3 is a view showing a basic layer constitution of a hard coat film of the second aspect of the invention.
Figure 4:
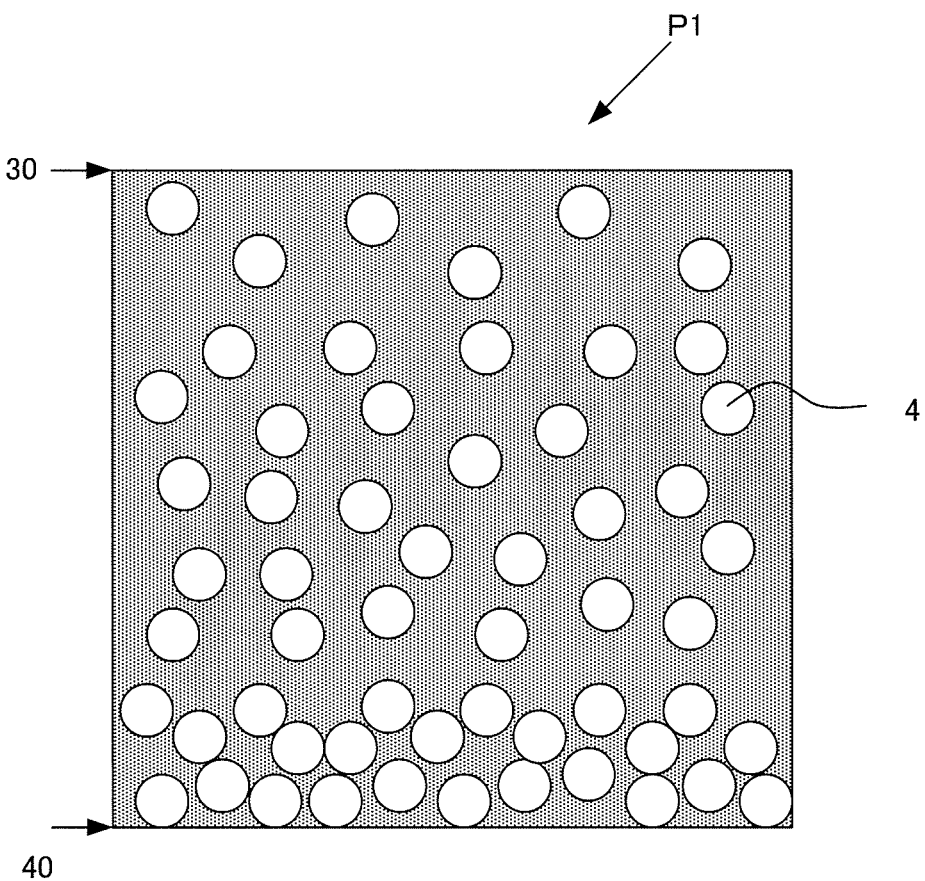
FIG. 4 is a view schematically showing an example of the distribution of the reactive inorganic fine particles (A) of the thickness-directional cross section of the hard coat film of the second aspect of the invention.
Figure 5:
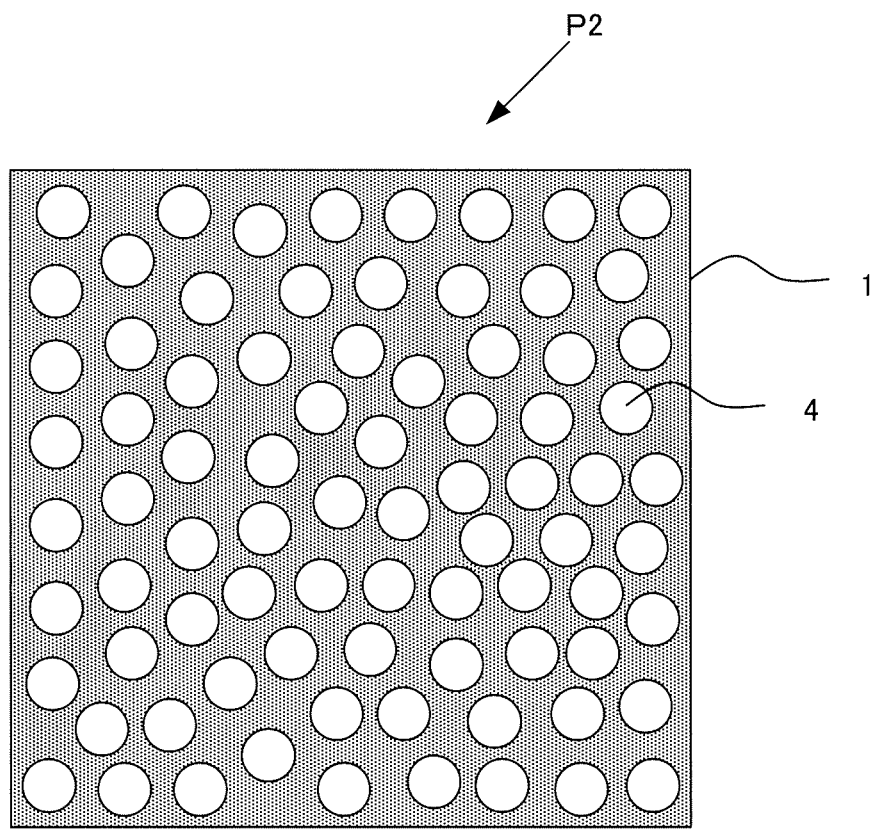
FIG. 5 is a view schematically showing an example of the distribution of the reactive inorganic fine particles (A) in the planar-directional cross section of the hard coat film of the second aspect of the invention.

FIG. 3 is a cross-sectional view showing an example of the hard coat film of the present invention. The hard coat film 10 in FIG. 3 comprises the transparent substrate film 2 and the hard coat layer 1 layered on one surface side of the transparent substrate film 2. The hard coat layer 1 contains reactive inorganic fine particles (A) 4 to improve abrasion resistance. In FIGS. 3 to 5, the scale size of the thickness direction (vertical direction in the figures) is largely exaggerated (enlarged) than the scale size of the planar direction (horizontal direction in the figures) for simplification of explanation.

FIG. 4 is a view showing the cross section P1-P1 of FIG. 3 from the direction perpendicular to the cross section P1, and schematically showing an example of the distribution of the reactive inorganic fine particles (A) 4 of the cross section P1. In FIG. 4, the density of the inorganic fine particles (A) 4 is low at the interface 30 and its vicinity on the side opposite to the transparent substrate film 2 side of the cross section P1, and the density of the inorganic fine particles (A) 4 is high at the interface 40 and its vicinity on the transparent substrate film 2 side of the cross section P1.

FIG. 5 is a view showing the cross section P2-P2 of FIG. 3 from the direction perpendicular to the cross section P2, and schematically showing an example of the distribution of the reactive inorganic fine particles (A) 4 of the cross section P2. In FIG. 5, the reactive inorganic fine particles (A) 4 are uniformly dispersed. The reactive inorganic fine particles (A) 4 do not form an island structure, in which particles aggregate and the particles dotted in the cross section P2.

When the thickness directional cross section of the hard coat layer is defined as P1 and the vertical-directional density of the reactive inorganic fine particle (A) in the cross section P1 is defined as the number (particles/$\mu m^2$) of the reactive inorganic fine particle (A) per unit area of the cross section P1, the density of the reactive inorganic fine particle (A) at any part in a region from the interface on the side opposite to the transparent substrate film side to 500 nm in depth of the cross section P1 is preferably 150 particles/$\mu m^2$ or less, more preferably from 50 particles/$\mu m^2$ to 100 particles/$\mu m^2$. Also, the density of the reactive inorganic fine particle (A) at any part in a region from the interface of the transparent substrate film side of the cross section P1 to the height ten times higher than the average particle diameter is preferably from 200 particles/$\mu m^2$ to 400 particles/$\mu m^2$, more preferably from 200 particles/$\mu m^2$ to 300 particles/$\mu m^2$. Herein, "any part" means a unit area randomly selected from the subject region.

Also, the number of the reactive inorganic fine particle (A) partially projected from the interface on the side opposite to the transparent substrate film side of the hard coat layer is preferably 150 or less per unit area of the interface, more preferably 130 or less.

When a planar-directional cross section of the hard coat layer is defined as P2 and the planar-direction density of the reactive inorganic fine particle (A) in the cross section P2 is defined as the number (particles/$\mu m^2$) of the reactive inorganic fine particle (A) per unit area of the cross section P2, difference of densities of the reactive inorganic fine particle (A) of any two parts in the cross section P2 at any height of the hard coat layer is preferably 30 particles/$\mu m^2$ or less, more preferably 20 particles/$\mu m^2$ or less.

The density of the reactive inorganic fine particle (A) is obtained by the following method.

Cross section photographies of a thickness-directional cross section P1 of the hard coat layer and a planar-directional cross section P2 of the hard coat layer are taken by SEM (scanning electron microscope) photographing. Next, the number of the reactive inorganic fine particles (A) in the region of 500 nm×500 nm is visually counted in the region from the interface on the side opposite to the transparent substrate film side of the cross section P1 to the depth of 500 nm. The obtained value is converted into the number of the reactive inorganic fine particles (A) per 1 $\mu m^2$ to obtain the vertical-direction density (particles/$\mu m^2$). Similarly, the number of the reactive inorganic fine particles (A) present in the range of 600 nm×600 nm in the cross section P2 is visually counted. The obtained value is converted into the number of the reactive inorganic fine particles (A) per 1 $\mu m^2$ to obtain the planar-direction density (particles/$cm^2$).

Generally, curable resin composition, which forms the surface of the hard coat layer in a thickness of about several nm, dissolves in an alkali solution upon saponification treatment of the hard coat film. If the reactive inorganic fine particles (A) partially protrude from the interface on the side opposite to the transparent substrate film side of the hard coat layer, the curable resin composition around the protruded inorganic fine particles (A) dissolves in an alkali solution. Thereby, a slight void is generated between the inorganic fine particles (A) and the curable resin composition therearound, and the inorganic fine particles (A) easily elute or drop from the surface of the hard coat layer.

To the contrary, by setting the density of the reactive inorganic fine particles (A) to the above region, the number of the reactive inorganic fine particles (A) at an interface and its vicinity on the side opposite to the transparent substrate film side of the hard coat layer, that is, the number of the inorganic fine particles (A) which elute or drop from the surface of the hard coat layer can be decreased. Hence, the hard coat film of the present invention exhibits excellent saponification resistance. Also, by using the hard coat film, a protecting film is not necessary upon saponification treatment so that the number of processes and the material cost can be reduced.

<Transparent Substrate Film>

Since the transparent substrate film used in the first aspect of the invention can be similarly used as the transparent substrate film used for the second aspect of the invention, most of the explanation thereof are omitted.

<Hard Coat Layer>

The hard coat layer used for the second aspect of the invention is mostly common with on used for the first aspect of the invention. The feature of the second aspect of the invention is as below.

The hard coat layer used for the second aspect of the invention preferably has a hardness of 4H or more on the surface of the hard coat layer by a pencil hardness test.

The layer thickness of the hard coat layer used for the second aspect of the invention is preferably from 1 μm to 100 μm, more preferably from 5 μm to 30 μm, from the viewpoint of abrasion resistance.

[Reactive Inorganic Fine Particles (A)]

Since the transparent substrate film used in the first aspect of the invention can be similarly used as the transparent substrate film used for the second aspect of the invention, most of the explanation thereof are omitted. The feature of the second aspect of the invention is as below.

As the reactive inorganic fine particle (A) used in the second aspect of the invention, a non-hollow particle not having a void or porous structure inside of the particle is preferably used rather than a particle having a void or porous structure inside of the particle such as a hollow particle. Since the hollow particle has a void or porous structure inside of the particle, the hollow particle has lower hardness than the non-hollow particle, and the hollow particle has smaller apparently specific gravity (mass per unit volume averaged including hollow parts) than the non-hollow particle so that the hollow particles at an interface and its vicinity on the side opposite to the transparent substrate film side of the hard coat layer easily increase. Hence, it is preferable to use a non-hollow particle having high hardness and high specific gravity compared to a hollow particle for the reactive inorganic fine particle (A).

The average particle diameter of the reactive inorganic fine particles (A) of the second aspect of the invention is from 30 nm to 100 nm, preferably from 40 nm to 60 nm. By setting the average particle diameter to the reactive inorganic fine particles (A) to 30 nm or more, abrasion resistance can be imparted to the hard coat layer, the diffusion coefficient of the reactive inorganic fine particles (A) can be decreased, and the density of the reactive inorganic fine particles (A) in an interface and its vicinity on the side opposite to the transparent substrate film side of the hard coat layer can be decreased. Also, by setting the average particle diameter of the reactive inorganic fine particles (A) to 100 nm or less, the crosslinking point in matrix with respect to the content can be increased, and a hard coat layer having high film strength can be obtained.

The reactive inorganic fine particles (A) preferably have a narrow particle size distribution and are monodispersed from the viewpoint of maintaining the recovery rate when the resin is used alone without deteriorating transparency and significantly improving hardness.

The average particle diameter of fine particles means the 50%, particle diameter (d50 median diameter) of fine particles, which is obtained when fine particles in a solution are measured by dynamic light scattering and the particle size distribution thus obtained is expressed by a cumulative distribution. The average particle diameter may be measured by means of Microtrac particle size analyzer manufactured by Nikkiso Co., Ltd.

The reactive inorganic fine particles (A) may be aggregated particles. If aggregated particles are used, it is preferable that not only the primary particle size but also the secondary particle size is in the above range.

When silane is used as the surface modification compound for preparing the reactive inorganic fine particles (A) used in the second aspect of the invention, silane at least partially having an organic residue substituted by fluorine may be used.

(Formation of Hard Coat Layer in Second Aspect)

In the case of forming the hard coat film of the second aspect of the invention, similarly as the first aspect, the curable resin composition for the hard coat layer is prepared, and coated on the transparent substrate film followed by drying.

The coating method is not particularly limited as long as it can uniformly apply the curable resin composition onto the surface of the transparent substrate film. For example, there may be used various kinds of methods such as a spin coating method, a dipping method, a spraying method, a slide coating method, a bar coating method, a roll coating method, a meniscus coating method, a flexo printing method, a screen printing method and a bead coater method.

The coating amount on the transparent substrate film varies depending on required performance of a hard coat film to be obtained, but is preferably from 1 $g/m^2$ to 30 $g/m^2$, more preferably from 5 $g/m^2$ to 25 $g/m^2$, after drying.

As the drying method, for example, there may be drying under reduced pressure, drying by heating, or a combination thereof. For example, in the case of using a ketone-based solvent as the solvent, the drying step is performed at a temperature in the range normally from room temperature to 80° C., preferably from 40° C. to 60° C., and for a time period from 20 seconds to 3 minutes, preferably from 30 seconds to 1 minute.

The reactive inorganic fine particles (A) uniformly dispersed in the curable resin composition for the hard coat layer are unevenly distributed near the interface on the transparent substrate film side in the drying process.

Next, the coating layer in the coating layer obtained by coating and drying the curable resin composition for the hard coat layer is light radiated and/or heated depending on the reactive functional group contained in the curable resin composition to be cured. Thereby, the reactive functional groups (a) of the reactive inorganic fine particles (A) and the reactive functional group (b) of the binder component (B) contained in the constituents of the curable resin composition are crosslinked, so that a hard coat layer constituted with a cured product of the curable resin composition is formed. Thus, the hard coat film of the present invention can be obtained.

For light radiation, mainly, UV, visible light, electron beam, ionizing radiation, etc. is used. In the case of UV curing, UV from ray of a super high pressure mercury lamp, high pressure mercury lamp, low pressure mercury lamp, carbon-arc lamp, xenon arc lamp or metalhallide lamp is used. The dose of energy beam source is about 50 to 5,000 $mJ/cm^2$ as the integral exposure amount at the UV wavelength of 365 nm.

In the case of heating after the light irradiation, the coating layer is heated normally at a temperature from 40° C. to 120° C. The coating layer may be left at room temperature (25° C.) for 24 hours or more to promote reaction. Heating treatment is generally performed from 40° C. to 120° C. Also, the reaction may be performed by leaving at room temperature (25° C.) for 24 hours or more.

EXAMPLES

Hereinafter, the present invention will be explained in detail with reference to examples. The scope of the present invention may not be limited to the following examples.

Hereinafter, methods of evaluation in Examples, procedure and evaluation results of Example A series, and procedure and evaluation results of Example B series will be sequentially explained. Example A series are examples related to the first aspect of the invention. Example B series are examples related to the second aspect of the invention.

In Examples, "part(s)" represents "part(s) by weight" if not particularly specified. Ones having an average particle diameter of ±10 nm are used for all of the particle size distribution of monodispersed fine particles compounded in the curable resin composition.

[Evaluation Methods]

Evaluation methods used in Examples are as follows.

(Evaluation 1) Pencil Hardness

The pencil hardness of the surface of the obtained hard coat layer was evaluated in accordance with JIS K5600-5-4 (1999). Five lines were drawn by a pencil having a hardness of 4H applying a load of 500 g. Then, presence of scratches on the hard coat layer was visually observed and evaluated according to the following criteria.

<Evaluation Criteria>

Evaluation ◎: there was 0 to 1 line of scratch (pencil hardness is 4H).

Evaluation ○: there were 2 to 3 lines of scratches (corresponding to the pencil hardness of about 3H).

Evaluation x: there were 4 to 5 lines of scratches.

(Evaluation 2) Steel Wool Resistance (SW Resistance)

The surface of the hard coat layer of the obtained hard coat film was frictioned or rubbed with #0000 steel wool by reciprocating the steel wool with a load of 1,000 g/cm$^2$ for 10 times. Then, presence of peeling of the hard coat layer was visually observed, and evaluated according to the following criteria.

<Evaluation Criteria>

Evaluation ◎: there was no scratch (steel wool resistance was 1,000 g/cm$^2$).

Evaluation ○: there were 1 to 9 lines of scratches.

Evaluation x: there were 10 lines or more of scratches.

(Evaluation 3) Saponification Resistance

The obtained hard coat film (double the size of A4) was dipped in 200 ml of a 2N sodium hydroxide aqueous solution at 60° C. for two minutes. Then, the hard coat film was rinsed by pure water for saponification treatment. Next, the sodium hydroxide aqueous solution after the saponification treatment was collected, and condensed by heat at 100° C. Then, pure water was added followed by further addition of nitric acid to make the solution become acid. The Si content in the sodium hydroxide aqueous solution was measured by ICP emission spectrometric analysis and evaluated.

<Evaluation Criteria>

Evaluation ◎: the Si content in the sodium hydroxide aqueous solution was less than 2.0 μg/g.

Evaluation ○: the Si content in the sodium hydroxide aqueous solution was from 2.0 to 8.0 μg/g.

Evaluation x: the Si content in the sodium hydroxide aqueous solution was more than 8.0 μg/g.

Example A Series

Invention of First Aspect

Production Example A1-1

Preparation of Reactive Inorganic Fine Particles (i))

(1) Surface Adsorbed Ion Removal

Aqueous dispersion colloidal silica (product name: SNOWTEX 20; manufactured by Nissan Chemical Industries, Ltd.; pH9 to 10; particle size: 20 nm) was subjected to ion exchange using 400 g of a cation-exchange resin (product name: Diaion SK1B; manufactured by: Mitsubishi Chemical Corporation) for 3 hours. Next, ion exchange was performed using 200 g of an anion-exchange resin (product name: Diaion SA20A; manufactured by: Mitsubishi Chemical Corporation) for 3 hours followed by rinsing. Thus, an aqueous dispersion of silica fine particles having a concentration of solid content of 20 wt % was obtained.

The $Na_2O$ content of the aqueous dispersion of the silica fine particles was 7 ppm per silica fine particle.

(2) Surface Treatment (Introduction of Monofunctional Monomer)

150 mL of isopropanol, 4.0 g of 3,6,9-trioxadecanoate and 4.0 g of methacrylic acid were added to 10 g of the aqueous dispersion of the silica fine particles after the above treatment (1), and agitated for 30 minutes to mix.

The obtained mixture was agitated while heating at 60° C. for 5 hours. Thus, a silica fine particles dispersion liquid having a methacryloyl group introduced on the surface of the silica fine particle was obtained. Distilled water and isopropanol were distilled away from the obtained silica fine particles dispersion liquid by means of a rotary evaporator while methyl ethyl ketone was added to prevent drying, so that the amount of remained water and isopropanol was 0.1 wt % at the end. Thus, a silica-dispersed methyl ethyl ketone solution having a solid content of 50 wt % was obtained.

Thus obtained reactive inorganic fine particles (i) was measured by means of Nanotrac particle size analyzer manufactured by Nikkiso Co., Ltd. The result was an average particle diameter of d50=21 nm. Also, the amount of the organic component covering the surface of the silica fine particles was measured by thermogravimetric analysis, and the result was $4.05 \times 10^{-3}$ g/m$^2$.

Production Example A1-2

Preparation of Reactive Inorganic Fine Particles (i-2)

Similarly as Production example 1-1, the surface adsorbed ion removal and the surface treatment were performed except that an aqueous dispersion colloidal silica (product name: SNOWTEX XS; manufactured by Nissan Chemical Industries, Ltd.; pH9 to 10; particle size: 5 nm) was used instead of aqueous dispersion silica having a particle size of 20 nm used in Production example A1-1.

Thus obtained reactive inorganic fine particles (i-2) were measured by means of the above particle size analyzer. The result was an average particle diameter of d50=5 nm. Also, the amount of the organic component covering the surface of the silica fine particles was measured by thermogravimetric analysis, and the result was $7.05 \times 10^{-3}$ g/m$^2$.

Production Examples A1 to A3

Preparation of Reactive Inorganic Fine Particles (i-3)

Similarly as Production example 1-1, the surface adsorbed ion removal and the surface treatment were performed except that an aqueous dispersion colloidal silica (product name: SNOWTEX 50; manufactured by Nissan Chemical Industries, Ltd.; pH9 to 10; particle size: 25 nm) was used instead of aqueous dispersion silica having a particle size of 20 nm used in Production example A1-1.

Thus obtained reactive inorganic fine particles (i-3) were measured by means of the above particle size analyzer. The result was an average particle diameter of d50=26 nm. Also, the amount of the organic component covering the surface of the silica fine particles was measured by thermogravimetric analysis, and the result was 3.24×10$^{-3}$ g/m$^2$.

Production Examples A1 to A4

Preparation of Reactive Inorganic Fine Particles (i-4)

Similarly as Production example 1-1, the surface adsorbed ion removal and the surface treatment were performed except that an aqueous dispersion colloidal silica (product name: SNOWTEX XL; manufactured by Nissan Chemical Industries, Ltd.; pH9 to 10; particle size: 60 nm) was used instead of aqueous dispersion silica having a particle size of 20 nm used in Production example A1-1.

Thus obtained reactive inorganic fine particles (i-4) were measured by means of the above particle size analyzer. The result was an average particle diameter of d50=63 nm. Also, the amount of the organic component covering the surface of the silica fine particles was measured by thermogravimetric analysis, and the result was 2.04×10$^{-3}$ g/m$^2$.

Production Example A2

Preparation of Reactive Inorganic Fine Particles (ii)

In dried air, 20.6 parts by weight of isophorone diisocyanate was dropped into a solution containing 7.8 parts by weight of mercaptopropyltrimethoxysilane and 0.2 parts by weight of dibutyl tin dilaurate while agitating at 50° C. for 1 hour, followed by agitation at 60° C. for 3 hours. Thereto, 71.4 parts by weight of pentaerythritol triacrylate was dropped at 30° C. for 1 hour, followed by agitation while heating at 60° C. for 3 hours. Thus, a compound (1) was obtained.

Under nitrogen flow, a mixture containing 88.5 parts by weight (solid content: 26.6 parts by weight) of methanol silica sol (product name: OSCAL series; manufactured by: JGC Catalysts and Chemicals Ltd.; methanol dispersion liquid; particle size: 20 nm), 8.5 parts by weight of the above synthesized compound (1) and 0.01 parts by weight of p-methoxyphenol was agitated at 60° C. for 4 hours. Next, after 3 parts by weight of methyltrimethoxysilane as a compound (2) was added to the mixture and agitated at 60° C. for 1 hours, 9 parts by weight of methyl o-formate ester was added followed by agitation while heating at the same temperature for another one hour. Thus, reactive inorganic fine particles (ii) were obtained.

Thus obtained reactive inorganic fine particles (ii) were measured by means of the above particle size analyzer. The result was an average particle diameter of d50=22 nm. Also, the amount of the organic component covering the surface of the silica fine particles was measured by thermogravimetric analysis, and the result was 7.08×10$^{-3}$ g/m$^2$.

Example A1

(1) Preparation of Curable Resin Composition for Hard Coat Layer

The following components were mixed, and adjusted with a solvent so that the solid content is 50 wt %. Thus, a curable resin composition for a hard coat layer was prepared.
<Composition of Curable Resin Composition for Hard Coat Layer>

UV1700B (product name; manufactured by: Nippon Synthetic Chemical Industry Co., Ltd.; 10 functional; molecular weight: 2,000): 70 parts by weight (solid content calibrated value)

Reactive inorganic fine particle (i) of Production example (A1-1): 30 parts by weight (solid content calibrated value)

Methyl ethyl ketone: 100 parts by weight

Irgacure 184 (product name; manufactured by: Chiba Specialty Chemicals, Inc.; radical polymerization initiator): 0.4 parts by weight (2) Production of Hard Coat Film As the transparent substrate film, a triacetate cellulose (TAC) film having a thickness of 80 μm was used. On the transparent substrate film, the curable resin composition for the hard coat layer prepared in (1) was coated by WET weight of 40 g/m$^2$ (weight when dried: 20 g/m$^2$). Drying was performed at 50° C. for 30 seconds, and UV of 200 mJ/cm$^2$ was irradiated. Thus, a hard coat film 10, a hard coat layer 1 of which has a thickness of 10 μm, was produced. In Table 1, the above evaluation results are shown.

Example A2

Similarly as Example A1, a curable resin composition for the hard coat layer was prepared except that the reactive inorganic fine particles (ii) of Production example (A2) was used so that the solid content part by weight was 30 parts by weight instead of the reactive inorganic fine particles (i) of Production example (A1-1) in the curable resin composition for the hard coat layer of Example A1. Then, similarly as Example 1, a hard coat film was produced. In Table 1, the evaluation results are shown.

The average particle number of the reactive inorganic fine particles (A) per unit area of a thickness-directional cross section of the hard coat layer of the hard coat film was 1,100/μm$^2$. Also, the average particle number of the reactive inorganic fine particles (A) per unit area of a thickness-directional cross section of the skin layer was 2,300/μm$^2$ (each of them is a calibrated value from STEM cross section photography).

From the above results, the average particle number of the reactive inorganic fine particles (A) per unit area of a thickness-directional cross section of the skin layer was 2.1 times larger than the average particle number of the hard coat layer. The evaluation of both pencil hardness and SW resistance were "⊚" (see Table 1).

Example A3

Similarly as Example A1, a curable resin composition for the hard coat layer was prepared except that 70 parts by weight of DPHA (product name: KAYARAD DPHA; manufactured by NIPPON KAYAKU CO., LTD.; six functional; molecular weight: 800) was used instead of UV1700B in the curable resin composition for the hard coat layer of Example A1. Then, similarly as Example A1, a hard coat film was produced. In Table 1, the evaluation results are shown.

Example A4

Similarly as Example A1, a curable resin composition for the hard coat layer was prepared except that 30 parts by weight of reactive inorganic fine particles (i-2) (average particle diameter: 5 nm) of Production example (A1-2) was used instead of 30 parts by weight of reactive inorganic fine particles (i) (average particle diameter: 21 nm) of Production example (A1-1) in the curable resin composition for the hard coat layer of Example A1. Then, similarly as Example A1, a hard coat film was produced. In Table 1, the evaluation results are shown.

Example 5

Similarly as Example A1, a curable resin composition for the hard coat layer was prepared except that 30 parts by weight of reactive inorganic fine particles (i-3) (average particle diameter: 26 nm) of Production example (A1-3) was used instead of 30 parts by weight of reactive inorganic fine particles (i) (average particle diameter: 21 nm) of Production example (A1-1) in the curable resin composition for the hard coat layer of Example A1. Then, similarly as Example A1, a hard coat film was produced. In Table 1, the evaluation results are shown.

Example A6

Similarly as Example A1, a curable resin composition for the hard coat layer was prepared except that UV1700B was used by 90 parts by weight, and the reactive inorganic fine particles (1) of Production example (A1-1) was used by 10 parts by weight in the curable resin composition for the hard coat layer of Example A1. Then, similarly as Example A1, a hard coat film was produced. In Table 1, the evaluation results are shown.

Example A7

Similarly as Example A1, a curable resin composition for the hard coat layer was prepared except that UV1700B was used by 40 parts by weight, and the reactive inorganic fine particles (i) of Production example (A1-1) was used by 60 parts by weight in the curable resin composition for the hard coat layer of Example A1. Then, similarly as Example A1, a hard coat film was produced. In Table 1, the evaluation results are shown.

Example A8

Similarly as Example A1, a hard coat film was produced except that a cycloolefin polymer (COP) film having a thickness of 80 μm was used instead of the triacetate cellulose film as the transparent substrate film in production of the hard coat film of Example A1. In Table 1, the evaluation results are shown.

Example A9

Similarly as Example A1, a hard coat film was produced except that a polyethylene terephthalate (PET) film having a thickness of 100 μm was used instead of the triacetate cellulose film as the transparent substrate film in production of the hard coat film of Example A1. In Table 1, the evaluation results are shown.

Example A10

Similarly as Example A1, a hard coat film was produced except that an acrylic resin film having a thickness of 100 μm was used instead of the cellulosetriacetate film as the transparent substrate film in production of the hard coat film of Example A1. In Table 1, the evaluation results are shown.

Comparative Example A1

Similarly as Example A1, a curable resin composition for the hard coat layer was prepared except that 30 parts by weight (solid content calibration) of untreated silica fine particles (product name: SNOWTEX YL; manufactured by: Nissan Chemical Industries, Ltd.; average particle diameter: 10 nm, concentration of solid content: 30 wt %) was used instead of 30 parts by weight of the reactive inorganic fine particles (i) in the curable resin composition for the hard coat layer of Example A1. The untreated silica fine particles were used, but in the column of reactive inorganic fine particles in Table 1, the solid content parts by weight and the average particle diameter are shown for descriptive purposes. Also, since the silica fine particles are not treated, there is no amount of the organic component. Similarly as Example A1, a hard coat film was produced. In Table 1, the evaluation results are shown.

Comparative Example A2>

Similarly as Example A1, a curable resin composition for the hard coat layer was prepared except that 30 parts by weight (solid content calibration) of the reactive inorganic fine particles (i-4) having an average particle diameter of 63 nm was used instead of 30 parts by weight of the reactive inorganic fine particles (i) having an average particle diameter of 21 nm in the curable resin composition for the hard coat layer of Example A1. Then, similarly as Example A1, a hard coat film was produced. In Table 1, the evaluation results are shown.

TABLE 1

| | | | Reactive inorganic fine particles (A) | | | | Evaluation | |
| | | | Average | | Part by | Amount of | 1 | 2 |
| | Transparent substrate film | Curable resin Type | particle diameter $d_{50}$ (nm) | Type | weight of solid content | organic component $\times 10^{-3}$ (g/m$^2$) | Pencil hardness | SW resistance |
|---|---|---|---|---|---|---|---|---|
| Example A1 | TAC | UV-1700B | 21 | i | 30 | 4.05 | ⊚ | ⊚ |
| Example A2 | TAC | UV-1700B | 22 | ii | 30 | 7.08 | ⊚ | ⊚ |
| Example A3 | TAC | DPHA | 21 | i | 30 | 4.05 | ⊚ | ⊚ |
| Example A4 | TAC | UV-1700B | 5 | i-2 | 30 | 7.05 | ⊚ | ⊚ |
| Example A5 | TAC | UV-1700B | 26 | i-3 | 30 | 3.24 | ⊚ | ⊚ |
| Example A6 | TAC | UV-1700B | 21 | i | 10 | 4.05 | ○ | ⊚ |
| Example A7 | TAC | UV-1700B | 21 | i | 60 | 4.05 | ○ | ⊚ |
| Example A8 | COP | UV-1700B | 21 | i | 30 | 4.05 | ⊚ | ⊚ |
| Example A9 | PET | UV-1700B | 21 | i | 30 | 4.05 | ⊚ | ⊚ |
| Example A10 | *1 | UV-1700B | 21 | i | 30 | 4.05 | ⊚ | ⊚ |

TABLE 1-continued

| | Transparent substrate film | Curable resin Type | Reactive inorganic fine particles (A) | | | | Evaluation | |
| | | | Average particle diameter $d_{50}$ (nm) | Type | Part by weight of solid content | Amount of organic component $\times 10^{-3}$ (g/m$^2$) | 1 Pencil hardness | 2 SW resistance |
|---|---|---|---|---|---|---|---|---|
| Comparative example A1 | TAC | UV-1700B | 10 | *2 | 30 | N/A | X | X |
| Comparative example A2 | TAC | UV-1700B | 63 | i-4 | 30 | 2.04 | ◎ | X |

*1 acrylic resin
*2 untreated silica fine particles

As shown in Table 1, the hard coat film of Comparative example A1, which does not contain the reactive inorganic fine particles, is inferior in abrasion resistance (both pencil hardness and SW resistance are "x"). Also, the hard coat film of Comparative example A2, which uses the reactive inorganic fine particles having an average particle diameter of 63 nm, is inferior in the SW resistance. It can be assumed that this is because uneven distribution of the reactive inorganic fine particles in the skin layer did not easily occur since the average particle diameter of the reactive inorganic fine particles was too large.

Since in the hard coat film obtained in each of Examples A1 to A10 of the present invention, the average particle diameter of the reactive inorganic fine particles having the reactive functional group is from 5 nm to 30 nm, and the reactive inorganic fine particles are unevenly distributed on the air interface side of the hard coat layer to form the skin layer, the hard coating performance can be improved.

Example B Series

Invention of Second Aspect

Production Example B1

Preparation of Reactive Inorganic Fine Particles (A) (1)

(1) Surface Adsorbed Ion Removal

Aqueous dispersion colloidal silica (product name: SNOWTEX ZL; manufactured by Nissan Chemical Industries, Ltd.; pH9 to 10; particle size: 90 nm) was subjected to ion exchange using 400 g of a cation-exchange resin (product name: Diaion SK1B; manufactured by: Mitsubishi Chemical Corporation) for 3 hours. Next, ion exchange was performed using 200 g of an anion-exchange resin (product name: Diaion SA20A; manufactured by: Mitsubishi Chemical Corporation) for 3 hours followed by rinsing. Thus, an aqueous dispersion of inorganic fine particles having a concentration of solid content of 20 wt % was obtained.

The Na$_2$O content of the aqueous dispersion of the inorganic fine particles was 7 ppm per inorganic fine particle.

(2) Surface Treatment (Introduction of Monofunctional Monomer)

150 mL of isopropanol, 4.0 g of 3,6,9-trioxadecanoate and 4.0 g of methacrylic acid were added to 10 g of the aqueous dispersion of the inorganic fine particles after the above treatment (1), and agitated for 30 minutes to mix.

The obtained mixture was agitated while heating at 60° C. for 5 hours. Thus, an inorganic fine particles dispersion liquid having a methacryloyl group introduced on the surface of the inorganic fine particle was obtained. Distilled water and isopropanol were distilled away from the obtained inorganic fine particles dispersion liquid by means of a rotary evaporator while methyl ethyl ketone was added to prevent drying, so that the amount of remained water and isopropanol was 0.1 wt % at the end. Thus, a silica-dispersed methyl ethyl ketone solution having a solid content of 50 wt % was obtained.

Thus obtained reactive inorganic fine particles (A) (1) was measured by means of Microtrac particle size analyzer manufactured by Nikkiso Co., Ltd. The result was an average particle diameter of d50=93 nm. Also, the amount of the organic component covering the surface of the inorganic fine particles was measured by thermogravimetric analysis, and the result was 4.05×10$^{-3}$ g/m$^2$.

Production Example B2

Preparation of Reactive Inorganic Fine Particles (A) (2)

(1) Surface Adsorbed Ion Removal

Similarly as Production example B1, an aqueous dispersion liquid of inorganic fine particles having the surface adsorbed ion removed were obtained.

(2) Surface Treatment (Introduction of Polyfunctional Monomer)

In similar manner as Production example B1, surface treatment was performed except that methacrylic acid was changed to dipentaerythritol pentaacrylate (product name: SR399; manufactured by Sartomer Company, Inc.) in Production example B1.

Thus obtained reactive inorganic fine particles (A) (2) were measured by means of the above particle size analyzer. The result was an average particle diameter of d50=93 nm. Also, the amount of the organic component covering the surface of the inorganic fine particles was measured by thermogravimetric analysis, and the result was 3.84×10$^{-3}$ g/m$^2$.

Production Example B3

Preparation of Reactive Inorganic Fine Particles (A) (3)

In dried air, 20.6 parts of isophorone diisocyanate was dropped into a solution containing 7.8 parts of mercaptopropyltrimethoxysilane and 0.2 parts of dibutyl tin dilaurate while agitating at 50° C. for 1 hour, followed by agitation at 60° C. for 3 hours. Thereto, 71.4 parts of pentaerythritol triacrylate was dropped at 30° C. for 1 hour, followed by agitation while heating at 60° C. for 3 hours. Thus, a compound (1) was obtained.

Under nitrogen flow, a mixture containing 88.5 parts by weight (solid content: 26.6 parts) of methanol silica sol (product name: OSCAL series; manufactured by: JGC Catalysts and Chemicals Ltd.; methanol dispersion liquid; number average particle diameter: 45 nm), 8.5 parts of the above synthesized compound (1) and 0.01 parts of p-methoxyphenol was agitated at 60° C. for 4 hours. Next, after 3 parts of methyltrimethoxysilane as a compound (2) was added to the mixture and agitated at 60° C. for 1 hours, 9 parts of methyl o-formate ester was added followed by agitation while heating at the same temperature for another one hour. Thus, crosslinkable inorganic fine particles were obtained. Thus obtained reactive inorganic fine particles (A) (3) were measured by means of the above particle size analyzer. The result was an average particle diameter of d50=49 nm. Also, the amount of the organic component covering the surface was measured by thermogravimetric analysis, and the result was $7.08 \times 10^3$ g/m$^2$.

Example B1

(1) Preparation of Curable Resin Composition for Hard Coat Layer

The following components were mixed, and adjusted with a solvent so that the solid content is 50 wt %. Thus, the curable resin composition for the hard coat layer was prepared.
<Composition of Curable Resin Composition for Hard Coat Layer>
- UV1700B (product name; manufactured by: Nippon Synthetic Chemical Industry Co., Ltd.; urethane acrylate; 10 functional; molecular weight: 2,000): 70 parts by weight (solid content calibrated value)
- Reactive inorganic fine particles (A) (1) (average particle diameter: 93 nm) of Production example B1: 30 parts by weight (solid content calibrated value)
- Methyl ethyl ketone: 100 parts by weight
- Irgacure 184 (product name; manufactured by: Chiba Specialty Chemicals, Inc.; radical polymerization initiator): 0.4 parts by weight (2) Production of Hard Coat Film As the transparent substrate film, a triacetate cellulose film having a thickness of 80 μm was used. On the substrate, the curable resin composition for the hard coat layer prepared in (1) was coated by WET weight of 40 g/m$^2$ (weight when dried: 20 g/m$^2$). Drying was performed at 50° C. for 30 seconds, and UV of 200 mJ/cm$^2$ was irradiated. Thus, a hard coat film of Example B1 was produced.

Example B2

Similarly as Example B1, a hard coat film was obtained except that 30 parts by weight of the reactive inorganic fine particles (A) (2) obtained in Production example B1 was used instead of the reactive inorganic fine particles (A) (1) obtained in Production example B1 in production of the hard coat film of Example B1.

Example B3

Similarly as Example B1, a hard coat film was obtained except that 30 parts by weight of the reactive inorganic fine particles (A) (3) obtained in Production example B3 was used instead of the reactive inorganic fine particles (A) (1) obtained in Production example B1 in production of the hard coat film of Example B1.

Example B4

Similarly as Example B1, a hard coat film was obtained except that the average particle diameter of the reactive inorganic fine particles (A) (1) obtained in Production example B1 was set to $d_{50}$=63 nm and 70 parts by weight of dipentaerythritolhexaacrylate (DPHA) was used as the binder component (B) in production of the hard coat film of Example B1.

Example B5

Similarly as Example B3, a hard coat film was obtained except that 90 parts by weight of UV1700B was used as the binder component (B) and 10 parts by weight of the reactive inorganic fine particles (A) (3) obtained in Production example B3 was used in production of the hard coat film of Example B3.

Example B6

Similarly as Example B3, a hard coat film was obtained except that 40 parts by weight of UV1700B was used as the binder component (B) and 60 parts by weight of the reactive inorganic fine particles (A) (3) obtained in Production example B3 was used in production of the hard coat film of Example B3.

Example B7

Similarly as Example B3, a hard coat film was obtained except that the average particle diameter of reactive inorganic fine particles (A) (3) obtained in Production example B3 was set to $d_{50}$=32 nm in production of the hard coat film of Example B3.

Example B8

Similarly as Example B3, a hard coat film was obtained except that the average particle diameter of reactive inorganic fine particles (A) (3) obtained in Production example B3 was set to $d_{50}$=100 nm in production of the hard coat film of Example B3.

Example B9

Similarly as Example B3, a hard coat film was obtained except that, as the binder component (B), 50 parts by weight of UV1700B and 20 parts by weight of BEAMSET 371 (product name; manufactured by Arakawa Chemical Industries, Ltd.; polymer acrylate, molecular weight: 30,000) were used in production of the hard coat film of Example B3.

Comparative Example B1

Similarly as Example B1, a hard coat film was obtained except that 30 parts by weight of colloidal silica (product name: MEK-ST; manufactured by Nissan Chemical Industries, Ltd.) having an average particle diameter of $d_{50}$=60 nm was used instead of the reactive inorganic fine particles (A) in production of the hard coat film of Example B1.

Comparative Example B2

Similarly as Example B3, a hard coat film was obtained except that the average particle diameter of the reactive inorganic fine particles (A) (3) obtained in Production example B3 was set to $d_{50}$=20 nm in production of the hard coat film of Example B3.

TABLE 2

|  | Binder component "B" | | Reactive inorganic fine particles "A" | | | | |
|---|---|---|---|---|---|---|---|
|  | Type | Content (part by weight) | Production method | Content (part by weight) | Average particle diameter (nm) | Saponifiability | Pencil hardness |
| Example B 1 | UV1700 B | 70 | 1 | 30 | 93 | ◎ | ◎ |
| Example B 2 | UV1700 B | 70 | 2 | 30 | 93 | ◎ | ◎ |
| Example B 3 | UV1700 B | 70 | 3 | 30 | 49 | ◎ | ◎ |
| Example B 4 | DPHA | 70 | 1 | 30 | 63 | ◎ | ◎ |
| Example B 5 | UV1700 B | 90 | 3 | 10 | 49 | ◎ | ○ |
| Example B 6 | UV1700 B | 40 | 3 | 60 | 49 | ◎ | ◎ |
| Example B 7 | UV1700 B | 70 | 3 | 30 | 32 | ◎ | ◎ |
| Example B 8 | UV1700 B | 70 | 3 | 30 | 100 | ◎ | ◎ |
| Example B 9 | UV1700 B / BEAMSET 371 | 50 / 20 | 3 | 30 | 49 | ◎ | ◎ |
| Comparative example B 1 | UV1700 B | 70 | — | 30 | 60 | X | X |
| Comparative example B 2 | UV1700 B | 70 | 3 | 30 | 20 | X | ◎ |

The invention claimed is:

1. A hard coat film in which a hard coat layer is provided on a transparent substrate film,
wherein the hard coat layer comprises a cured product of a curable resin composition containing:
a non-hollow reactive inorganic fine particle (A) having an average particle diameter of 5 nm to 26 nm, and having a reactive functional group (a) introduced by an organic component consisting of methacryiic acid and one or more kinds selected from the group consisting of formic acid, acetic acid, propionic acid, butyric acid, valeric acid, caproic acid, acrylic acid, crotonic acid, citric acid, adipic acid, succinic acid, glutaric acid, oxalic acid, maleic acid, fumaric acid, itaconic acid and stearic acid, and acid anhydrides, chlorides, esters and amides corresponding thereto, methoxyacetic acid, 3,6-dioxa hepatanoate and 3,6,9-trioxa decanoate, which covers at least a part of a surface of the reactive inorganic fine particle (A), on the surface, and
a curable binder system containing a binder component (B) having a reactive functional group (b) cross-linkingly reactive with the reactive functional group (a) of the reactive inorganic fine particle (A), and the curable binder system itself also having curing reactivity;
wherein the hard coat layer has a skin layer in its surface region being an interface and its vicinity on a side opposite to a transparent substrate film side of the hard coat layer, in which the skin layer has higher average particle number of the reactive inorganic fine particle (A) per unit area of a thickness-directional cross section of the hard coat layer than a region of the hard coat layer closer to the transparent substrate film side than the surface region; and
wherein an average particle number of the reactive inorganic fine particle (A) per unit area of a thickness-directional cross section of the skin layer is twice or more than that of the reactive inorganic fine particle (A) per unit area of the thickness-directional cross section of the hard coat layer.

2. The hard coat film according to claim 1, wherein a thickness of the skin layer is a thickness from the interface on the side opposite to the transparent substrate film side to the average particle diameter of the reactive inorganic fine particle (A) up to twice of the average particle diameter.

3. The hard coat film according to claim 1, wherein the reactive inorganic fine particles (A) are aggregated in the skin layer.

4. The hard coat film according to claim 1, wherein the average particle number of the reactive inorganic fine particle (A) per unit area of the thickness-directional cross section of the skin layer is 2,000/$\mu m^2$ or more, and an average particle number of the reactive inorganic fine particle (A) per unit area of the thickness-directional cross section of the whole hard coat layer is 2,000/$\mu m^2$ or less.

5. The hard coat film according to claim 1, wherein the surface of the hard coat layer has no scratch after a steel wool scratch test, in which the surface of the hard coat layer is frictioned with #0000 steel wool by reciprocating the steel wool with a load of 500 g/$cm^2$ for 10 times at a speed of 50 mm/sec.

6. The hard coat film according to claim 1, wherein a layer thickness of the hard coat layer is from 2 to 30 μm.

7. The hard coat film according to claim 1 wherein the reactive functional group (a) of the reactive inorganic fine particle (A) and the reactive functional group (b) of the binder component (B) have an ethylene double bond.

8. The hard coat film according to claim 1, wherein the binder component (B) is a compound having three or more reactive functional groups (b).

9. The hard coat film according to claim 1, wherein a content of the reactive inorganic fine particle (A) is from 10 to 60 wt % with respect to a total solid content.

10. The hard coat film according to claim 1, wherein the transparent substrate film mainly comprises cellulose acylate, a cycloolefin polymer, an acrylate-based polymer or polyester.

* * * * *